(12) United States Patent
Ito et al.

(10) Patent No.: US 9,710,117 B2
(45) Date of Patent: Jul. 18, 2017

(54) TRANSFER MATERIAL, MANUFACTURING METHOD OF ELECTROSTATIC CAPACITANCE TYPE INPUT DEVICE, ELECTROSTATIC CAPACITANCE TYPE INPUT DEVICE, AND IMAGE DISPLAY DEVICE INCLUDING THE SAME

(71) Applicant: FUJIFILM Corporation, Tokyo (JP)

(72) Inventors: Hideaki Ito, Fujinomiya (JP); Shinichi Kanna, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 42 days.

(21) Appl. No.: 14/627,533

(22) Filed: Feb. 20, 2015

(65) Prior Publication Data

US 2015/0169113 A1 Jun. 18, 2015

Related U.S. Application Data

(63) Continuation of application No. PCT/JP2013/068461, filed on Jul. 5, 2013.

(30) Foreign Application Priority Data

Sep. 11, 2012 (JP) ................................ 2012-199402

(51) Int. Cl.
*G06F 3/044* (2006.01)
*G06F 3/041* (2006.01)
(Continued)

(52) U.S. Cl.
CPC ......... *G06F 3/044* (2013.01); *C09D 151/003* (2013.01); *G06F 1/16* (2013.01);
(Continued)

(58) Field of Classification Search
CPC combination set(s) only.
See application file for complete search history.

(56) References Cited

U.S. PATENT DOCUMENTS 7,442,648 B2 10/2008 Kim et al.
7,824,043 B2 * 11/2010 Hatano ................... G02B 1/111
359/582
(Continued)

FOREIGN PATENT DOCUMENTS

| CN | 101680968 A | 3/2010 |
|---|---|---|
| JP | 11268166 A | 10/1999 |

(Continued)

OTHER PUBLICATIONS

Communication dated Nov. 5, 2015, issued by the Korean Intellectual Property Office in corresponding Korean Application No. 10-2014-7036429.
(Continued)

*Primary Examiner* — Van Chow
(74) *Attorney, Agent, or Firm* — Sughrue Mion, PLLC

(57) ABSTRACT

To provide a transfer material which is capable of improving the visibility of a transparent electrode pattern of an electrostatic capacitance type input device, and is capable of improving the productivity of the electrostatic capacitance type input device. A transfer material includes a temporary supporter and a transparent curable resin layer laminated on the temporary supporter, and a refractive index of the transparent curable resin layer at a wavelength of 550 nm is 1.55 or more.

28 Claims, 9 Drawing Sheets

(51) Int. Cl.
*C09D 151/00* (2006.01)
*G06F 1/16* (2006.01)
(52) U.S. Cl.
CPC ............ *G06F 3/041* (2013.01); *G06F 3/0412* (2013.01); *G06F 2203/04103* (2013.01); *Y10T 29/49155* (2015.01); *Y10T 428/3192* (2015.04); *Y10T 428/31507* (2015.04); *Y10T 428/31663* (2015.04); *Y10T 428/31736* (2015.04); *Y10T 428/31743* (2015.04); *Y10T 428/31797* (2015.04); *Y10T 428/31928* (2015.04)

(56) References Cited

U.S. PATENT DOCUMENTS

| | | | |
|---|---|---|---|
| 7,972,684 B2 | 7/2011 | Hara et al. | |
| 8,450,753 B2* | 5/2013 | Shiota | G02F 1/13452 257/678 |
| 8,674,953 B2 | 3/2014 | Lu et al. | |
| 9,012,549 B2 | 4/2015 | Tanaka et al. | |
| 9,254,627 B2 | 2/2016 | Hattori et al. | |
| 2006/0269724 A1* | 11/2006 | Ohashi | G02B 1/111 428/143 |
| 2007/0139780 A1* | 6/2007 | Suzuki | G02B 1/111 359/586 |
| 2008/0138589 A1 | 6/2008 | Wakabayashi et al. | |
| 2008/0303968 A1* | 12/2008 | Terada | H01L 29/78 349/46 |
| 2009/0016209 A1* | 1/2009 | Ikeda | C08J 5/18 369/284 |
| 2010/0053101 A1 | 3/2010 | Nozawa et al. | |
| 2010/0245715 A1* | 9/2010 | Watanabe | G02B 5/02 349/64 |
| 2010/0302636 A1 | 12/2010 | Suzuki et al. | |
| 2011/0169792 A1* | 7/2011 | Shimizu | G02F 1/1309 345/204 |
| 2011/0230584 A1 | 9/2011 | Araki et al. | |
| 2012/0107518 A1* | 5/2012 | Matsunaga | B32B 27/08 427/517 |
| 2013/0285182 A1* | 10/2013 | Saie | G02B 5/201 257/432 |
| 2013/0288021 A1* | 10/2013 | Hayashida | B82Y 10/00 428/195.1 |

FOREIGN PATENT DOCUMENTS

| | | |
|---|---|---|
| JP | 2007-334045 A | 12/2007 |
| JP | 2008-107779 A | 5/2008 |
| JP | 2010-061425 A | 3/2010 |
| JP | 2010-276713 A | 12/2010 |
| JP | 2011-95716 A | 5/2011 |
| JP | 2012009219 A | 1/2012 |
| JP | 2012-069515 A | 4/2012 |
| JP | 2012-086477 A | 5/2012 |
| JP | 2012088683 A | 5/2012 |
| JP | 2012-148484 A | 8/2012 |
| KR | 1020100125164 A | 11/2010 |
| KR | 10-2012-0034105 A | 4/2012 |
| TW | 200614279 A | 5/2006 |
| TW | 200732851 A | 9/2007 |
| TW | I319204 B | 1/2010 |
| TW | 201005436 A | 2/2010 |
| TW | 201040990 A | 11/2010 |
| TW | 201122641 A | 7/2011 |
| TW | 201145105 A | 12/2011 |
| TW | 201218147 A | 5/2012 |
| TW | 201224103 A | 6/2012 |
| WO | 2006/126604 A1 | 11/2006 |
| WO | 2009116363 A1 | 9/2009 |
| WO | 2010/061744 A1 | 6/2010 |
| WO | 2011102286 A1 | 8/2011 |

OTHER PUBLICATIONS

Communication dated Feb. 23, 2016 from the Japanese Patent Office in counterpart application No. 2012-199402.
International Preliminary Report on Patentability and Written Opinion, issued Mar. 17, 2015, for corresponding International Application No. PCT/JP2013/068461, 5 pages in English.
International Search Report for PCT/JP2013/068461 dated Oct. 15, 2013, 5 pages in Japanese and English.
Written Opinion for PCT/JP2013/068461 dated Oct. 15, 2013, 3 pages.
Notice of Reasons for Rejection, dated Aug. 25, 2015, issued in corresponding JP Application No. 2012-199402, 19 pages in English and Japanese.
Communication dated Jul. 11, 2016 from the State Intellectual Property Office of the P.R.C. in counterpart Application No. 201380035236.2.
Communication dated Jun. 17, 2016 from the Korean Intellectual Property Office in counterpart Application No. 10-2014-7036429.
Communication dated Aug. 22, 2016 from the Korean Intellectual Property Office in counterpart Application No. 10-2014-7036429.
Communication dated Oct. 6, 2016 from the Korean Intellectual Property Office in counterpart Application No. 10-2016-7019748.
Action in corresponding Taiwanese Application No. 102132700, dated Sep. 22, 2016, 34 pages in English (partial translation) and Chinese.
Communication dated Feb. 13, 2017 from the State Intellectual Property Office of the P.R.C. in counterpart Application No. 201380035236.2.
Taiwanese Communication, issued Apr. 21, 2017, in corresponding TW Application No. 102132700, 19 pages in English and Chinese.

* cited by examiner

TRANSFER MATERIAL, MANUFACTURING METHOD OF ELECTROSTATIC CAPACITANCE TYPE INPUT DEVICE, ELECTROSTATIC CAPACITANCE TYPE INPUT DEVICE, AND IMAGE DISPLAY DEVICE INCLUDING THE SAME

CROSS REFERENCE TO RELATED APPLICATIONS

This application is a Continuation of PCT International Application No. PCT/JP2013/068461 filed on Jul. 5, 2013, which claims priority under 35 U.S.C §119(a) to Japanese Patent Application No. 2012-199402 filed on Sep. 11, 2012, all of which are hereby expressly incorporated by reference into the present application.

BACKGROUND OF THE INVENTION

1. Field of the Invention

The present invention relates to a manufacturing method of an electrostatic capacitance type input device capable of detecting a finger touch position as a change in electrostatic capacitance, an electrostatic capacitance type input device obtained using the same manufacturing method, and an image display device including the same electrostatic capacitance type input device as a constituent.

2. Description of the Related Art

In recent years, there have been electronic devices such as mobile phones, car navigations, personal computers, ticket-vending machines, and automated teller machines in which a tablet-type input apparatus is disposed on the surface of a liquid crystal apparatus or the like, and information corresponding to a menu button is input by touching a position at which the menu button is displayed using a finger or a stylus while referring to menu buttons displayed in an image display region of the liquid crystal apparatus.

As the above-described input apparatus (touch panel), there are a resistance film-type input apparatus, an electrostatic capacitance type input device, and the like. However, the resistance film-type input apparatus has a double layer structure of a film and a glass plate in which the apparatus is shorted out by pressing the film, and thus has disadvantages of a narrow operation temperature range and poor durability against temporal alteration.

On the contrary, the electrostatic capacitance type input device has an advantage of a simple structure in which a translucent conductive film is formed on a single substrate.

As the electrostatic capacitance type input device, an electrostatic capacitance-type touch panel in which a mask layer, a transparent electrode pattern, an interlayer insulating layer, a transparent protective film, and the like are integrally formed on the non-touch side surface of a front surface plate is known, and the front surface plate is integrated with the electrostatic capacitance type input device, and therefore it becomes possible to reduce the layer thickness and weight. WO2010/061744A describes the use of a cured film obtained by curing a siloxane resin composition including a fluorine resin as a protective film for a touch panel or an insulating film for a touch sensor.

In recent years, increasing attention has been paid to solve the poor appearance of the electrostatic capacitance type input device caused by the visible electrode pattern shape and the like, and, for example, JP2010-061425A describes that, to improve the visibility of a transparent electrode pattern such as an ITO pattern (to make the pattern invisible), it is effective to decrease the difference in the refractive index of ITO by increasing the refractive indices of transparent insulating layers being laminated.

In addition, as a smartphone or a tablet PC including the electrostatic capacitance-type touch panel on a liquid crystal display or an organic EL display, a smartphone or a tablet PC in which reinforced glass represented by GORILLA glass manufactured by Corning Incorporated is used in the front surface plate (the surface directly touched by a finger) has been developed and announced. In addition, a smartphone or a tablet PC in which an opening portion is formed in a part of the front surface plate to install a pressure-sensitive (a mechanical mechanism in which, instead of a change in the electrostatic capacitance, a pressing force is used) switch has been launched. Since the reinforced glass has high strength and is not easily processed, it is usual to form an opening portion before a reinforcing treatment and then carry out the reinforcing treatment to form the opening portion.

As a method for forming the transparent insulating layer or the transparent protective film, WO2010/061744A and JP2010-061425A only describe methods in which coating is carried out in a case in which an organic material is used. Meanwhile, JP2007-334045A and JP2008-107779A describe transfer materials for a color filter, and propose the lamination of the transfer material on a substrate.

SUMMARY OF THE INVENTION

However, in the method for forming the transparent insulating layer or the transparent protective film described in WO2010/061744A and JP2010-061425A, when an attempt is made to form a transparent insulating layer or a transparent protective film using the coating method described in WO2010/061744A and JP2010-061425A and the material described in WO2010/061744A and JP2010-061425A, a resist component is leaked or extruded through the opening portion, and thus a step for removing the extruded component becomes necessary, which creates a problem with a significant decrease in the production efficiency. In addition, JP2007-334045A and JP2008-107779A mention the use of the transfer materials in a liquid crystal apparatus, but do not include any description regarding the improvement of the ITO pattern visibility and the application of the transfer materials to the electrostatic capacitance type input device.

An object of the present invention is to provide a transfer material which is capable of improving the visibility of a transparent electrode pattern when being used in an electrostatic capacitance type input device, and is capable of improving the productivity of the electrostatic capacitance type input device.

The present inventors carried out intensive studies to solve the above-described problem. As a result, the present inventors found that the use of a transfer material including a transparent curable resin layer having a refractive index of 1.55 or more at a wavelength of 550 nm is capable of solving the above-described problem, and the present inventors provided the present invention described below.

The present invention which is specific means for achieving the object of the present invention is as described below.

[1] A transfer material including a temporary supporter and a transparent curable resin layer laminated on the temporary supporter, in which a refractive index of the transparent curable resin layer at a wavelength of 550 nm is 1.55 or more.

[2] The transfer material according to [1], in which the transparent curable resin layer preferably includes a monomer having a refractive index of 1.55 or more.

[3] The transfer material according to [1] or [2], in which the transparent curable resin layer preferably includes a binder having a refractive index of 1.55 or more.

[4] The transfer material according to any one of [1] to [3], in which the transparent curable resin layer preferably includes fine particles having a refractive index of 1.55 or more.

[5] The transfer material according to any one of [1] to [4], in which a thermoplastic resin layer is preferably laminated between the temporary supporter and the transparent curable resin layer.

[6] The transfer material according to [5], in which a melt viscosity ηc of the thermoplastic resin layer measured at 110° C. is preferably in a range of 250 Pa·s to 3000 Pa·s.

[7] The transfer material according to any one of [1] to [6], in which the transparent curable resin layer is preferably used for a transparent insulating layer or a transparent protective layer in an electrostatic capacitance type input device.

[8] A manufacturing method of an electrostatic capacitance type input device including at least one of a transparent insulating layer and a transparent protective layer, and a transparent electrode pattern, in which at least one of the transparent insulating layer and the transparent protective layer is formed using the transfer material according to [7].

[9] The manufacturing method of an electrostatic capacitance type input device according to [8], in which the electrostatic capacitance type input device includes a front surface plate and at least the following (1) to (5) elements on a non-touch side of the front surface plate on a non-touch side of the front surface plate, and at least one of the (3) and (5) elements is preferably formed using the transfer material.

(1) A plurality of first transparent electrode patterns in which a plurality of pad sections are formed to extend in a first direction through connection sections (2) A plurality of second transparent electrode patterns which are electrically insulated from the first transparent electrode patterns, and are constituted of a plurality of pad sections formed so as to extend in a direction intersecting the first direction (3) A transparent insulating layer which electrically insulates the first transparent electrode patterns and the second transparent electrode patterns (4) A conductive element other than the first transparent electrode patterns and the second transparent electrode patterns which is electrically connected to at least one of the first transparent electrode patterns and the second transparent electrode patterns (5) A transparent protective layer installed so as to cover all or some of the (1) to (4) elements

[10] The manufacturing method of an electrostatic capacitance type input device according to [8] or [9], in which the front surface plate preferably includes an opening portion in at least a part of the front surface plate.

[11] An electrostatic capacitance type input device which is manufactured using the manufacturing method of an electrostatic capacitance type input device according to any one of [8] to [10].

[12] An image display device including the electrostatic capacitance type input device according to [11].

According to the present invention, it is possible to provide a transfer material which is capable of improving the visibility of a transparent electrode pattern of an electrostatic capacitance type input device, and is capable of improving the productivity of the electrostatic capacitance type input device.

DESCRIPTION OF THE PREFERRED EMBODIMENTS

Figure 1:
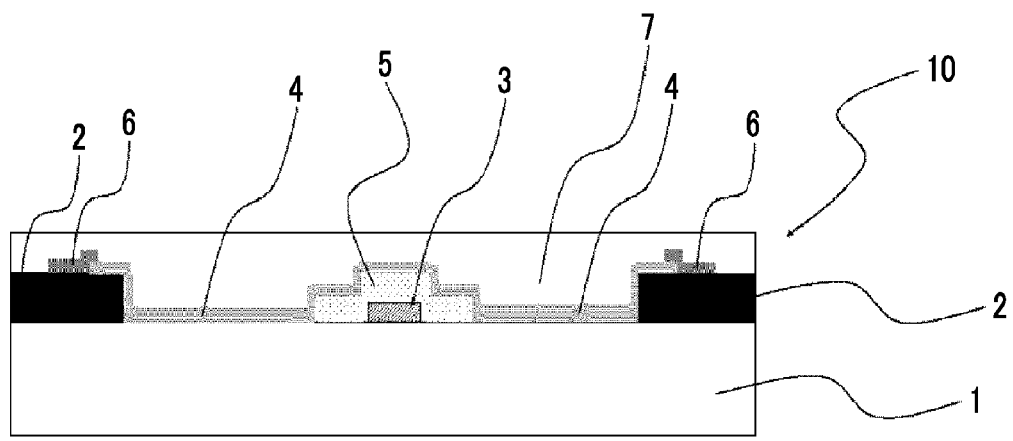
FIG. 1 is a cross-sectional view illustrating a constitution of an electrostatic capacitance type input device of the present invention.

Hereinafter, a transfer material, a manufacturing method of an electrostatic capacitance type input device, an electrostatic capacitance type input device, and an image display device of the present invention will be described. In the following description of the constitution requirements, there are cases in which the description is based on the typical embodiments or specific examples of the present invention, but the present invention is not limited to the embodiments or specific examples. Meanwhile, in the present specification, numeric ranges expressed using "to" indicate ranges including the numeric values before and after the "to" as the lower limit value and the upper limit value.

<<Transfer Material>>

The transfer material of the present invention includes a temporary supporter and a transparent curable resin layer laminated on the temporary supporter, and the refractive index of the transparent curable resin layer at a wavelength of 550 nm is 1.55 or more.

In this constitution, the transfer material is capable of improving the visibility of a transparent electrode pattern when being used in an electrostatic capacitance type input device, and is capable of improving the productivity of the electrostatic capacitance type input device. It is not restrained by any theories that, when the difference in the refractive index between the transparent electrode pattern (preferably ITO) and the transparent curable resin layer is decreased, the amount of light being reflected is decreased, and the transparent electrode pattern becomes easily visible, whereby the visibility can be improved.

Hereinafter, the transfer material of the present invention will be described. The transfer material of the present invention may be a negative-type material or a positive-type material. The transfer material of the present invention is preferably used for a transparent insulating layer or a transparent protective layer in an electrostatic capacitance type input device.

<Temporary Supporter>

The transfer material of the present invention includes a temporary supporter. For the temporary supporter, it is possible to use a flexible material which is not significantly deformed, shrunk, or elongated under pressurization or under pressurization and heating. Examples of the temporary supporter include a polyethylene terephthalate film, a cellulose triacetate film, a polystyrene film, a polycarbonate film, and the like, and, among the above-described films, a biaxially-stretched polyethylene terephthalate film is particularly preferred.

The thickness of the temporary supporter is not particularly limited, and is generally in a range of 5 μm to 200 μm, and is particularly preferably in a range of 10 μm to 150 μm in terms of ease of handling, versatility, and the like.

In addition, the temporary supporter may be transparent, or may include a silicon dye, an alumina sol, a chromic salt, a zirconium salt, or the like.

In addition, the temporary supporter in the transfer material of the present invention can be made to be conductive using the method described in JP2005-221726A or the like.

<Transparent Curable Resin Layer>

The transfer material of the present invention includes a transparent curable resin layer, and the refractive index of the transparent curable resin layer at a wavelength of 550 nm is 1.55 or more. In the present specification, unless particularly otherwise described, the refractive index refers to a refractive index at 550 nm.

The transparent curable resin layer may be photo-curable, thermo-crosslinkable (thermosetting), or both photo-curable and thermo-crosslinkable (thermosetting).

The transparent curable resin layer is preferably at least photo-curable, that is, is preferably a photo-curable resin layer. The transparent curable resin layer is more preferably both photo-curable and thermo-crosslinkable (thermosetting).

The refractive index of the transparent curable resin layer at a wavelength of 550 nm is 1.55 or more, preferably 1.6 or more, and more preferably 1.66 or more from the viewpoint of improving the visibility of the transparent electrode pattern. The upper limit value of the refractive index of the transparent curable resin layer at a wavelength of 550 nm is not particularly limited, but is preferably 2.3 or less from the viewpoint of the manufacturing cost.

The below-described difference Δn in the refractive index between the transparent electrode pattern and the transparent curable resin layer is preferably 0.4 or less, and more preferably 0.3 or less.

There is no particular limitation regarding a method for setting the refractive index of the transparent curable resin layer in the above-described range, and examples thereof include a method in which at least one of a binder having a refractive index of 1.55 or more, a monomer having a refractive index of 1.55 or more, and fine particles having a refractive index of 1.55 or more is added to the transparent curable resin layer. The transparent curable resin layer may include any one or two or more of a binder having a refractive index of 1.55 or more, a monomer having a refractive index of 1.55 or more, and fine particles having a refractive index of 1.55 or more.

The transparent curable resin layer preferably includes a binder having a refractive index of 1.55 or more, more preferably includes a binder having a refractive index of 1.6 or more, and particularly preferably includes a binder having a refractive index of 1.66 or more.

There is no particular limitation regarding the binder having a refractive index of 1.55 or more, and a well-known binder may be used. Examples of the binder having a refractive index of 1.55 or more are preferably polymers including at least one of an aryl group, an aromatic heterocyclic group, a chlorine atom, a bromine atom, an iodine atom, and a sulfur atom, and more preferably polymers including an aryl group. Specific examples of a preferable high-refractive index polymer include copolymers of a polystyrene polymer and, for example, acrylonitrile, maleic acid anhydride, acrylic acid, methacrylic acid, or an ester thereof, vinylidene chloride copolymers (for example, a vinylidene chloride/acrylonitrile copolymer, a vinylidene chloride/methacrylate copolymer, a vinylidene chloride/vinyl acetate copolymer), polyvinyl chloride and copolymers (for example, polyvinyl chloride/acetate and a vinyl chloride/acrylonitrile copolymer), polyvinyl benzal synthetic rubber (for example, a butadiene/acrylonitrile copolymer, an acrylonitrile/butadiene/styrene copolymer, a methacrylate/acrylonitrile/butadiene/styrene copolymer, 2-chlorobutadiene-1,3 polymer, chlorinated rubber, styrene/butadiene/styrene, and a styrene/isoprene/styrene block copolymer), copolyesters (for example, polymethylene glycols of a formula of $HO(CH_2)nOH$ (in the formula, n represents an integer of 2 to 10), copolyesters manufactured from a reaction product of (1) hexahydroterephthalic acid, sebacic acid, and terephthalic acid, (2) terephthalic acid, isophthalic acid, and sebacic acid, (3) terephthalic acid and sebacic acid, or (4) terephthalic acid and isophthalic acid, and mixtures of (5) the glycol and a copolyester manufactured from (i) terephthalic acid, isophthalic acid, and sebacic acid, (ii) terephthalic acid, isophthalic acid, sebacic acid, and adipic acid), poly N-vinyl carbozol and copolymers thereof, polycarbonates made up of carbonate ester and bisphenol, and the like. In addition, the preferable examples also include silicon compounds such as poly(methyl phenyl siloxane) and 1,3,5-trimethyl-1,1,3,5,5-pentaphenyl trisiloxane, silicon oil having many aromatic groups, and the like. In addition, the preferable examples also include compounds having a skeleton of fluorene, tetraphenylmethane, 1,1,2,2-tetraphenylethane, biphenyl, or the like.

Among them, compounds having a skeleton of fluorene, tetraphenylmethane, 1,1,2,2-tetraphenylethane, biphenyl, or the like are preferred, and compounds having a fluorene skeleton are particularly preferred.

The content of the binder having a refractive index of 1.55 or more in the transparent curable resin layer is not particularly limited, but is preferably in a range of 1 mass % to 60 mass %, more preferably in a range of 3 mass % to 40 mass %, and particularly preferably in a range of 5 mass % to 30 mass % with respect to the transparent curable resin layer.

The transparent curable resin layer preferably includes a monomer having a refractive index of 1.55 or more, more preferably includes a monomer having a refractive index of 1.6 or more, and particularly preferably includes a monomer having a refractive index of 1.66 or more.

The monomer having a refractive index of 1.55 or more is not particularly limited, and a well-known monomer may be used. Examples of the monomer having a refractive index of 1.55 or more include bis(4-methacryloylthiophenyl)sulfide, bisphenoxyethanol fluorene diacrylate, vinyl naphthalene, vinyl phenyl sulfide, 4-methacryloxyphenyl-4'-methoxyphenylthioether, tetrabromo bisphenol A diepoxy acrylate, and the like.

Among them, in the transfer material of the present invention, the monomer having a refractive index of 1.55 or more is preferably a bisarylfluorene-based acrylate, more preferably the compound expressed by Formula (1) in WO2010/061744A or bis(4-methacryloylthiophenyl)sulfide, and particularly preferably the compound described in paragraph [0063] in WO2010/061744A.

Specific examples of the monomer having a refractive index of 1.55 or more include OGSOL EA-0200, OGSOL EA-F5003, OGSOL EA-F5503, OGSOL EA-F5510, and the like manufactured by Osaka Gas Chemicals Co., Ltd.

The content of the monomer having a refractive index of 1.55 or more in the transparent curable resin layer is not particularly limited, but is preferably in a range of 1 mass % to 60 mass %, more preferably in a range of 3 mass % to 40 mass %, and particularly preferably in a range of 5 mass % to 30 mass % with respect to the transparent curable resin layer.

The transparent curable resin layer preferably includes fine particles having a refractive index of 1.55 or more, more preferably includes fine particles having a refractive index of 1.6 or more, and particularly preferably includes fine particles having a refractive index of 1.66 or more.

Examples of the high-refractive index fine particles having a refractive index of 1.55 or more include particles containing as a main component an oxide, a composite oxide, or a sulfide of Ti, Zr, Ta, In, Nd, Sn, Sb, Zn, La, W, Ce, Nb, V, Sm, Y, or the like. Here, the main component refers to a component having the greatest content (mass %) among components constituting the particles. The high-refractive index fine particles are more preferably particles containing as a main component an oxide or a composite oxide containing at least one metal element selected from Ti, Zr, Ta, In, and Sn.

The high-refractive index fine particles are still more preferably particles containing as a main component an oxide or a composite oxide containing at least one metal element selected from Ti and Zr.

The content of the fine particles having a refractive index of 1.55 or more in the transparent curable resin layer is not particularly limited, but is preferably in a range of 20 mass % to 80 mass %, more preferably in a range of 30 mass % to 70 mass %, and particularly preferably in a range of 35 mass % to 65 mass % with respect to the transparent curable resin layer.

In a case in which the transfer material of the present invention is a negative-type material, when the transparent curable resin layer is a photo-curable resin layer, the photo-curable resin layer preferably includes an alkali-soluble resin (which is preferably a binder having a refractive index of less than 1.55), a polymerizing compound (which is preferably a monomer having a refractive index of less than 1.55), and a polymerization initiator or a polymerization-initiating system.

As the alkali-soluble resin included in the transfer material of the present invention, it is possible to use the polymers described in paragraph [0025] in JP2011-95716A, and paragraphs [0033] to [0052] in JP2010-237589A.

As the polymerizing compound, it is possible to use the polymerizing compounds described in paragraphs [0023] and [0024] in JP4098550B.

As the polymerization initiator or the polymerization-initiating system, it is possible to use the polymerizing compounds described in paragraphs [0031] to [0042] in JP2011-95716A.

Furthermore, the photo-curable resin layer may include additives. Examples of the additives include the surfactants described in paragraph [0017] in JP4502784B and paragraphs [0060] to [0071] in JP2009-237362A, the thermal polymerization inhibitors described in paragraph [0018] in JP4502784B, and furthermore, other additives described in paragraphs [0058] to [0071] in JP2000-310706A.

In addition, when the transparent curable resin layer included in the transfer material of the present invention is manufactured through coating, it is possible to use the solvents described in paragraphs [0043] and [0044] in JP2011-95716A as a solvent.

Thus far, a case in which the transfer material of the present invention is a negative-type material has been mainly described, but the transfer material of the present invention may be a positive-type material. In a case in which the transfer material of the present invention is a positive-type material, and the transparent curable resin layer is a photo-curable resin layer, for example, the material described in JP2005-221726A or the like can be used for the photo-curable resin layer, but the positive-type material is not limited thereto.

In a case in which an insulating layer is formed using the transfer material of the present invention, the layer thickness of the transparent curable resin layer is preferably in a range of 0.1 µm to 5 µm, more preferably in a range of 0.3 µm to 3 µm, and particularly preferably in a range of 0.5 µm to 2 µm from the viewpoint of maintaining the insulating properties.

In a case in which a transparent protective layer is formed using the transfer material of the present invention, the layer thickness of the transparent curable resin layer is preferably in a range of 0.5 µm to 10 µm, more preferably in a range of 0.8 µm to 5 µm, and particularly preferably in a range of 1 µm to 3 µm from the viewpoint of exhibiting a sufficient surface protection function.

Here, the viscosities of the respective layers can be measured in the following manner. A measurement sample is produced by removing the solvent from the thermoplastic resin layer or the transparent curable resin layer through atmospheric pressure and reduced-pressure drying, the viscosities are measured using, for example, a VIBRON (DD-III type: manufactured by Baldwin Technology Company, Inc.) as a measurement instrument under conditions of a measurement start temperature of 50° C., a measurement end temperature of 150° C., a temperature rise rate of 5° C./minute, and a frequency of 1 Hz/deg, and the value measured at 100° C. can be used.

<Thermoplastic Resin Layer>

The transfer material of the present invention preferably includes a thermoplastic resin layer laminated between the temporary supporter and the transparent curable resin layer from the viewpoint of preventing the generation of air bubbles during lamination. The thermoplastic resin layer is preferably alkali-soluble. The thermoplastic resin layer plays a role of a cushion material so as to absorb unevenness on the foundation surface (also including unevenness and the like generated by previously-formed images and the like), and is preferably capable of transforming in accordance with unevenness on a surface that the thermoplastic resin layer comes into contact with.

The thermoplastic resin layer preferably includes the organic macromolecular substance described in JP1993-72724A (JP-H5-72724A) as a component, and particularly preferably includes at least one selected from organic macromolecular substances having a softening point of 80° C. or lower by the Vicat method [specifically, the polymer softening point measurement method by the American material testing method ASTMD1235].

Specific examples include organic macromolecules such as polyolefin such as polyethylene or polypropylene, ethylene copolymers of ethylene and vinyl acetate or a saponified substance thereof copolymers of ethylene and acrylic acid ester or a saponified substance thereof, vinyl chloride copolymers of polyvinyl chloride or vinyl chloride and vinyl acetate or a saponified substance thereof, polyvinylidene chloride, vinylidene chloride copolymers, polystyrene, styrene copolymers of styrene and (meth)acrylic acid ester or a saponified substance thereof, polyvinyl toluene, vinyl toluene copolymers of vinyl toluene and (meth)acrylic acid ester or a saponified substance thereof, poly(meth)acrylic acid ester, (meth)acrylic acid esters copolymers of butyl (meth) acrylate and vinyl acetate, polyamide resins such as vinyl acetate copolymer nylon, copolymerized nylon, N-alkoxymethylated nylon, and N-dimethylaminoated nylon, and the like.

In the transfer material of the present invention, the layer thickness of the thermoplastic resin layer is preferably in a range of 3 μm to 30 μm. In a case in which the layer thickness of the thermoplastic resin layer is less than 3 μm, the thermoplastic resin layer does not sufficiently follow the foundation surface during lamination, and thus, in some cases, is not capable of fully absorbing unevenness on the foundation surface. In addition, in a case in which the layer thickness exceeds 30 μm, a load is applied during the drying (the removal of the solvent) when the thermoplastic resin layer is formed on the temporary supporter, or a phenomenon in the thermoplastic resin layer takes time, which, in some cases, deteriorates the process aptitude. The layer thickness of the thermoplastic resin layer is more preferably in a range of 4 μm to 25 μm, and particularly preferably in a range of 5 μm to 20 μm.

The thermoplastic resin layer can be formed by applying a prepared liquid including a thermoplastic organic macromolecule, and the prepared liquid used during the application can be prepared using a solvent. The solvent is not particularly limited as long as the solvent is capable of dissolving macromolecular components constituting the layer, and examples thereof include methyl ethyl ketone, cyclohexanone, propylene glycol monomethyl ether acetate, n-propanol, 2-propanol, and the like.

<Viscosities of the Thermoplastic Resin Layer and the Transparent Curable Resin Layer>

In the transfer material of the present invention, the melt viscosity ηc of the thermoplastic resin layer measured at 110° C. is preferably in a range of 250 Pa·s to 3000 Pa·s, more preferably in a range of 300 Pa·s to 2500 Pa·s, and particularly preferably in a range of 500 Pa·s to 2000 Pa·s.

<Other Layers>

The transfer material of the present invention can be preferably constituted by providing an intermediate layer between the transparent curable resin layer and the thermoplastic resin layer, or further providing a protective film or the like on the surface of the transparent curable resin layer.

In the transfer material of the present invention, an intermediate layer is preferably provided for the purpose of preventing the components from being mixed together when a plurality of layers are coated and when the layers are stored after the coating. The intermediate layer is preferably an oxygen-blocking film having an oxygen-blocking function which is described in JP1993-72724A (JP-H5-72724A) as "a separation layer", and the intermediate layer is capable of increasing the sensitivity during exposure and decreasing the time load of a stepper, and improves the productivity.

As the intermediate layer and the protective film, it is possible to appropriately use the layers and the films described in paragraphs [0083] to [0087] and [0093] in JP2006-259138A.

<Method for Producing the Transfer Material>

The transfer material of the present invention can be produced according to the method for producing a photosensitive transfer material described in paragraphs [0094] to [0098] in JP2006-259138A.

Specifically, in a case in which the transfer material of the present invention including the intermediate layer is formed, the transfer material can be preferably produced in the following manner. A solution (a coating fluid for the thermoplastic resin layer) in which the thermoplastic organic macromolecule and additives are dissolved is applied onto the temporary supporter, and is dried so as to provide a thermoplastic resin layer. A prepared liquid (a coating fluid for the intermediate layer) prepared by adding a resin or additives to a solvent that does not dissolve the thermoplastic resin layer is applied onto the thermoplastic resin layer, and is dried so as to laminate the intermediate layer. Furthermore, a coating fluid for the transparent curable resin layer prepared using a solvent that does not dissolve the intermediate layer is applied onto the intermediate layer, and is dried so as to laminate the transparent curable resin layer.

<<Manufacturing Method of an Electrostatic Capacitance Type Input Device>>

A manufacturing method of an electrostatic capacitance type input device of the present invention (hereinafter, referred to simply as "the manufacturing method of the present invention") is a manufacturing method of an electrostatic capacitance type input device including at least one of a transparent insulating layer and a transparent protective layer, and a transparent electrode pattern, in which at least one of the transparent insulating layer and the transparent protective layer is formed using the transfer material of the present invention.

The constitution of the electrostatic capacitance type input device formed using the manufacturing method of the present invention will be described. FIG. 1 is a cross-sectional view illustrating the constitution of the electrostatic capacitance type input device of the present invention. An electrostatic capacitance type input device 10 in FIG. 1 is constituted of a front surface plate 1, a mask layer 2, first transparent electrode patterns 3, second transparent electrode patterns 4, a transparent insulating layer 5, a conductive element 6, and a transparent protective layer 7.

In the manufacturing method of an electrostatic capacitance type input device of the present invention, the electrostatic capacitance type input device includes the front surface plate and at least the following (1) to (5) elements on a non-touch side of the front surface plate, and it is preferable that at least one of the (3) and (5) elements be formed using the transfer material of the present invention, and it is more preferably that all of the (3) and (5) elements be formed using the transfer material of the present invention.

(1) A plurality of first transparent electrode patterns in which a plurality of pad sections are formed to extend in a first direction through connection sections (2) A plurality of second transparent electrode patterns which are electrically insulated from the first transparent electrode patterns, and are constituted of a plurality of pad sections formed so as to extend in a direction intersecting the first direction (3) A transparent insulating layer which electrically insulates the first transparent electrode patterns and the second transparent electrode patterns (4) A conductive element other than the first transparent electrode patterns and the second transparent electrode patterns which is electrically connected to at least one of the first transparent electrode patterns and the second transparent electrode patterns (5) A transparent protective layer installed so as to cover all or some of the (1) to (4) elements (Front Surface Plate)

The front surface plate 1 is constituted of a translucent substrate such as a glass substrate, and it is possible to use reinforced glass represented by GORILLA glass manufactured by Corning Incorporated. In addition, in FIG. 1, the side of the front surface plate 1 on which the respective elements are provided will be referred to as a non-touch surface. In the electrostatic capacitance type input device 10 of the present invention, information is input by touching a touch surface (the surface opposite to the non-touch surface) of the front surface plate 1 using a finger or the like. Hereinafter, in some cases, the front surface plate will be called "the base material".

In addition, to enhance the adhesiveness of the transparent curable resin layer or the photosensitive resin layer by lamination in the subsequent transfer step, it is possible to carry out a surface treatment on the non-touch surface of the base material (the front surface plate) in advance. As the surface treatment, a surface treatment (a silane coupling treatment) in which a silane compound is used is preferably carried out. A silane coupling agent preferably has a functional group that interacts with a photosensitive resin. For example, a silane coupling fluid (an aqueous solution of 0.3 mass % of N-β(aminoethyl)γ-aminopropyltrimethoxysilane, trade name: KBM603, manufactured by Shin-Etsu Chemical Co., Ltd.) is blown through showering for 20 seconds, and the surface is cleaned by showering pure water. After that, a reaction is caused by heating the surface. A heating chamber may be used, and a reaction can be accelerated through the substrate preliminary heating of a laminator.

(Transparent Insulating Layer, Transparent Protective Layer)

In FIG. 1, the first transparent electrode patterns 3 and the second transparent electrode patterns 4 are electrically insulated by the insulating layer 5.

In addition, in FIG. 1, the transparent protective layer 7 is provided so as to cover all the respective constituents. The transparent protective layer 7 may be constituted so as to cover only some of the respective constituents.

The transparent insulating layer 5 and the transparent protective layer 7 may be made of the same material, or may be made of different materials, but the transparent insulating layer and the transparent protective layer are preferably made of the same material since the visibility of the transparent electrode pattern can be improved, and it is possible to suppress reflection at the interface between the transparent insulating layer 5 and the transparent protective layer 7.

Particularly, in the case of the constitution of FIG. 1 in which the electrostatic capacitance type input device includes both the transparent insulating layer 5 and the transparent protective layer 7, the transparent protective layer 7 is on the front surface plate 1 side (upper side) of the second transparent electrode pattern 4, and the transparent insulating layer 5 is on the back side (lower side) of the second transparent electrode pattern 4, but it is more preferable to form both the transparent insulating layer 5 and the transparent protective layer 7, which are members on and beneath the transparent electrode pattern, using the transparent curable resin layer in the transfer material of the present invention from the viewpoint of improving the visibility of the transparent electrode pattern.

A material that constitutes the transparent insulating layer 5 and the transparent protective layer 7 is a material that is used for the transparent curable resin layer in the transfer material of the present invention, and a material that is not only capable of improving the visibility of the transparent electrode pattern, but also has a high surface hardness and strong heat resistance is preferred.

In the manufacturing method of an electrostatic capacitance type input device of the present invention, the transparent insulating layer 5 and the transparent protective layer 7 are preferably formed by transferring the transparent curable resin layer to the front surface plate 1 using the transfer material of the present invention.

For example, in a case in which the transparent insulating layer 5 is formed, it is possible to form the transparent insulating layer by transferring the transparent curable resin layer to the surface of the front surface plate 1 on which the first transparent electrode pattern is formed using the transfer material of the present invention including the insulating transparent curable resin layer as the transparent curable resin layer. In a case in which the transparent protective layer 7 is formed, it is possible to form the transparent protective layer by transferring the transparent curable resin layer to the surface of the front surface plate 1 on which the respective elements are formed using the transfer material of the present invention including the transparent curable resin layer which is transparent.

When the transparent insulating layer 5 and the transparent protective layer 7 are formed using the transfer material of the present invention, even in the substrate (the front surface plate) having an opening portion, it is possible to sufficiently improve the visibility of the transparent electrode pattern even in the vicinity of the opening portion with no leakage of a resist component through the opening portion.

A method for forming the transparent insulating layer and the transparent protective layer using the transfer material of the present invention will be described. Generally, in a case in which a transfer film is used, the transparent insulating layer and the transparent protective layer can be formed using an ordinary photolithography method as long as the transparent curable resin layer in the transfer film is a transparent curable resin layer including a photo-curable resin. In addition, in a case in which the transparent curable resin layer in the transfer film does not include a photo-curable resin, the transparent insulating layer and the transparent protective layer can be formed using a half-cut transferring method. Among them, in the manufacturing method of an electrostatic capacitance type input device of the present invention, the photolithography method is preferred.

(1) Photolithography

A patterning method in a case in which the transparent insulating layer and the transparent protective layer are formed using the photolithography method will be described.

The transfer material of the present invention is laminated on the base material (the front surface plate), is exposed in a necessary pattern shape, and then non-exposed sections in the case of the negative-type material and exposed sections in the case of the positive-type material are removed through a development treatment, whereby a pattern can be obtained. At this time, during the development, the thermoplastic resin layer and the photo-curable resin layer may be developed and removed using separate liquids or the same liquid. If necessary, a well-known development facility such as a brush or a high-pressure jet may be combined. After the development, if necessary, post exposure and post baking may be carried out.

Examples of a method for forming a transparent curable resin layer pattern in a case in which the transparent curable resin layer includes a photo-curable resin layer include a method including a protective film-removing step in which the protective film is removed from the transfer material of the present invention, a transfer step in which the transparent curable resin layer including the photo-curable resin of the transfer material of the present invention from which the protective film has been removed is transferred to the base material, an exposure step in which the transparent curable resin layer including the photo-curable resin layer that has been transferred to the base material is exposed, and a development step in which the exposed transparent curable resin layer including the photo-curable resin is developed so as to obtain a pattern image. In this case, the method preferably further includes a step in which the transferred transparent curable resin layer including the photo-curable resin is post-exposed after the transfer step.

—Transfer Step—

The transfer step is a step in which the transparent curable resin layer including the photo-curable resin of the transfer material of the present invention from which the protective film has been removed is transferred to the base material.

At this time, a method in which the temporary supporter is removed after the transparent curable resin layer including the photo-curable resin of the transfer material of the present invention is laminated on the base material is preferred.

The transparent curable resin layer including the photo-curable resin is transferred (attached) to the base material surface by overlaying, pressurizing, and heating the transparent curable resin layer including the photo-curable resin on the base material surface. To attach the transparent curable resin layer to the base material surface, it is possible to use a well-known laminator such as a laminator, a vacuum laminator, or an auto-cutting laminator which is capable of further increasing the productivity.

—Exposure Step, Development Step, and Other Steps—

As Examples of the Exposure Step, the Development Step, and Other Steps, it is Possible to preferably use the methods described in paragraphs [0035] to [0051] in JP2006-23696A even in the present invention.

The exposure step is a step in which the transparent curable resin layer which has been transferred to the base material and includes the photo-curable resin is exposed.

Specifically, a predetermined mask is disposed above the transparent curable resin layer which is formed on the base material and includes the photo-curable resin, and then the transparent curable resin layer is exposed through the mask, the thermoplastic resin layer, and the intermediate layer using a light source above the mask.

Here, the light source for the exposure can be appropriately selected from light sources which are capable of radiating light in a wavelength range (for example, 365 nm, 405 nm, or the like) in which the transparent curable resin layer including the photo-curable resin can be cured. Specific examples thereof include an ultrahigh-pressure mercury lamp, a high-pressure mercury lamp, a metal halide lamp, and the like. The exposure amount is generally in a range of approximately 5 mJ/cm$^2$ to 200 mJ/cm$^2$, and preferably in a range of approximately 10 mJ/cm$^2$ to 100 mJ/cm$^2$.

The development step is a step in which the exposed transparent curable resin layer including the photo-curable resin is developed.

The development can be carried out using a developer. The developer is not particularly limited, and a well-known developer such as the developer described in JP1993-72724A (JP-H5-72724A) can be used. Furthermore, a preferred developer makes the photo-curable resin layer exhibit a dissolution-type development behavior, and, for example, a developer preferably includes a compound having a pKa in a range of 7 to 13 at a concentration of 0.05 mol/L to 5 mol/L. Furthermore, a small amount of an organic solvent that is miscible with water may be added. Examples of the organic solvent that is miscible with water include methanol, ethanol, 2-propanol, 1-propanol, butanol, diacetone alcohol, ethylene glycol monomethyl ether, ethylene glycol monoethyl ether, ethylene glycol mono-n-butyl ether, benzyl alcohol, acetone, methyl ethyl ketone, cyclohexanone, $\epsilon$-caprolactone, $\gamma$-butyrolactone, dimethylformamide, dimethylacetamide, hexamethylphosphoramide, ethyl lactate, methayl lactate, $\epsilon$-caprolactam, N-methylpyrrolidone, and the like. The concentration of the organic solvent is preferably in a range of 0.1 mass % to 30 mass %. In addition, it is possible to further add a well-known surfactant to the developer. The concentration of the surfactant is preferably in a range of 0.01 mass % to 10 mass %.

The development method may be any of paddle development, shower development, shower and spin development, dip development, and the like. During the shower development, it is possible to remove non-cured sections by blowing the developer to the exposed transparent curable resin layer including the photo-curable resin through showering. Furthermore, in a case in which the thermoplastic resin layer or the intermediate layer is provided, it is preferable to remove the thermoplastic resin layer, the intermediate layer, and the like by blowing an alkali fluid in which the transparent curable resin layer including the photo-curable resin is poorly dissolved through showering or the like before the development. In addition, it is preferable to remove development residues by blowing a cleaning agent or the like through showering and rubbing the transparent curable resin layer using a brush or the like. The liquid temperature of the developer is preferably in a range of 20° C. to 40° C., and the pH of the developer is preferably in a range of 8 to 13.

The manufacturing method of the electrostatic capacitance type input device of the present invention may include other steps such as a post exposure step, a post baking step, and the like.

Furthermore, the patterning exposure may be carried out after the temporary supporter is peeled off, or the patterning exposure may be carried out before the temporary supporter is peeled off, and then the temporary supporter is peeled off. The exposure may be exposure in which a mask is used or digital exposure in which a laser or the like is used.

(2) Transferring Through Half-Cutting

In a transferring method through half-cutting, it is preferable that, first, the boundary between an image section and a non-image section in the transparent curable resin layer be precut using a razor, then, the protective film, the transparent curable resin layer, and the intermediate layer in the non-image section be removed using tape, furthermore, the protective film in the image section be removed in the same manner, and the transparent curable resin layer pattern is transferred to the substrate.

Subsequently, it is possible to form the transparent curable resin layer pattern by removing the thermoplastic resin layer and the intermediate layer through the development.

If necessary, a well-known development facility such as a brush or a high-pressure jet may be combined. After the development, if necessary, post exposure and post baking may be carried out, and post baking is preferably carried out.

The transferring method through half-cutting preferably includes a step in which slits that penetrate the transparent curable resin layer, but are not deep enough to penetrate the temporary supporter are formed in a part of the transfer film of the present invention, a step in which the transparent curable resin layer in at least a partial region of a region surrounded by the slits is removed, and a step in which the transparent curable resin layer is formed using the transfer film from which the transparent curable resin layer in the partial region has been removed.

The step in which the slits that penetrate the transparent curable resin layer, but are not deep enough to penetrate the temporary supporter are formed in a part of the transfer film is also called a step of precutting an image section being transferred in the transparent curable resin layer in advance. Meanwhile, the formation of the slits that are as deep as described above is also called half-cutting.

The step in which the transparent curable resin layer in at least a partial region of a region surrounded by the slits is removed is also called a step of removing the transparent curable resin layer in the non-image section not being transferred.

Furthermore, in a case in which the transfer film of the present invention includes the protective film, the intermediate layer, or the thermoplastic resin layer, the step in which the transparent curable resin layer in at least a partial region of a region surrounded by the slits is removed is preferably a step in which the protective film and the transparent curable resin layer in the non-image section and the protective film in the image section are removed.

The step in which the transparent curable resin layer is formed using the transfer film from which the transparent curable resin layer in the partial region has been removed is also called a transfer step of transferring the transparent curable resin layer in the image section to the base material.

Furthermore, in a case in which the transfer film of the present invention includes the protective film, the intermediate layer, or the thermoplastic resin layer, the step in which the transparent curable resin layer is formed using the transfer film from which the transparent curable resin layer in the partial region has been removed is preferably a transfer step of transferring the transparent curable resin layer in the image section in the transfer film from which the protective film has been removed to the base material.

In this case, furthermore, the step in which the transparent curable resin layer is formed using the transfer film from which the transparent curable resin layer in the partial region has been removed preferably includes a step of peeling off the temporary supporter transferred to the base material.

In this case, furthermore, the step in which the transparent curable resin layer is formed using the transfer film from which the transparent curable resin layer in the partial region has been removed preferably includes a step of removing the thermoplastic resin layer and the intermediate layer.

The manufacturing method of the present invention more preferably includes the step of precutting the image section being transferred in the transparent curable resin layer in the transfer film of the present invention in advance, the step of removing the protective film and the transparent curable resin layer in the non-image section and the protective film in the image section, the transfer step of transferring the transparent curable resin layer in the image section to the base material from which the protective film has been removed, the step of peeling off the temporary supporter transferred to the base material, and the step of removing the thermoplastic resin layer and the intermediate layer.

—Precutting Step—

In a case in which an image is not formed using an ordinary photolithography method, it is necessary to form an image section in the transparent curable resin layer before the transfer of the image. The step in which the slits that penetrate the transparent curable resin layer, but are not deep enough to penetrate the temporary supporter are formed in a part of the transfer film (the precutting step) will be described below.

A method for forming the slits is not particularly limited, and the slits can be formed using an arbitrary method such as a blade or a laser, but the slits are preferably formed using a blade. In addition, there is no particular limitation regarding the structure of the blade.

When the transfer film is constituted by, for example, sequentially laminating the temporary supporter, the thermoplastic resin layer, the intermediate layer, the transparent curable resin layer, and the protective film, it is possible to separate the image section being transferred and the non-image section not being transferred by, for example, forming slits that penetrate the protective film, the transparent curable resin layer, and the intermediate layer from above the protective film, and reach a part of the thermoplastic resin layer using a blade or a laser.

—Step of Removing the Transparent Curable Resin Layer from the Non-Image Section—

The selective transferring of the image section in the precut transparent curable resin layer to the substrate requires an effort not to transfer the non-image section. One method is the removal of the transparent curable resin layer in the non-image section before the transferring in which the transparent curable resin layer in the non-image section and the intermediate layer are peeled off at the same time after the protective film is removed. Another method is a method in which the protective film in the non-image section is peeled off, subsequently, the transparent curable resin layer and the intermediate layer are peeled off at the same time, and furthermore, the protective film on the image section is peeled off. The latter method is preferred since the image section in the transparent curable resin layer is protected until immediately before the transferring.

—Other Steps—

The step of removing the protective film, the transfer step of transferring the transparent curable resin layer in the image section in the transfer film from which the protective film has been removed to the base material, the step of peeling off the temporary supporter transferred to the base material, and the step of removing the thermoplastic resin layer and the intermediate layer are the same as in the photolithography method.

(Mask Layer)

The manufacturing method of an electrostatic capacitance type input device of the present invention also preferably further includes a step of forming the mask layer.

The mask layer 2 is provided on the non-touch surface of the front surface plate 1 in FIG. 1. The mask layer 2 is a frame-shaped pattern around a display region formed on the non-touch side of the front surface plate of the touch panel, and is formed to make drawing wires and the like invisible.

Figure 2:
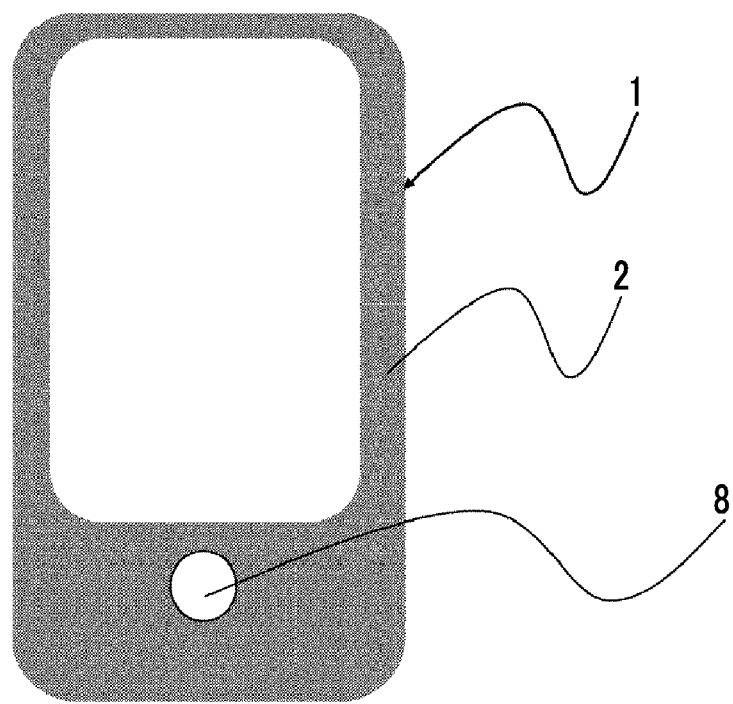
FIG. 2 is an explanatory view illustrating an example of a front surface plate in the present invention.

As illustrated in FIG. 2, the mask layer 2 is provided in the electrostatic capacitance type input device 10 of the present invention so as to cover a part of a region (a region other than an input surface in FIG. 2) of the front surface plate 1. Furthermore, it is possible to provide an opening portion 8 in a part of the front surface plate 1 as illustrated in FIG. 2. In the opening portion 8, it is possible to install a mechanical switch that is operated when pressed.

In the manufacturing method of an electrostatic capacitance type input device, there is no particular limitation regarding a method for forming layers other than the (3) and (5) elements such as the mask layer 2, but the layers are preferably formed using photosensitive films including the temporary supporter and the photo-curable resin layer in this order, and the layers are more preferably formed using photosensitive films including the temporary supporter, the thermoplastic resin layer, and the photo-curable resin layer in this order. Meanwhile, as the photosensitive film mentioned herein, the transfer material of the present invention may be used, or a photosensitive film other than the transfer material of the present invention may be used.

A preferable range of the step of forming the mask layer 2 by transferring the photo-curable resin layer to the front surface plate 1 using the photosensitive film is the same as the preferable ranges of the respective steps of the photolithography method in the method for forming the transparent insulating layer and the transparent protective layer.

Preferable aspects of the photosensitive film used in a case in which permanent materials such as the mask layer 2, the first transparent electrode patterns 3, the second transparent electrode patterns 4, and the conductive element 6, which will be described below, are formed using the photolithography method include a photosensitive film provided with a photo-curable resin layer having an arbitrary function instead of the transparent curable resin layer in the transfer material of the present invention. In addition, in the photosensitive film, a preferable range of layers other than the photo-curable resin layer is the same as the preferable ranges of layers other than the transparent curable resin layer in the transfer material of the present invention.

In a case in which the photosensitive film is used for the formation of the mask layer 2, a coloring agent is preferably added to the photo-curable resin layer.

When the mask layer 2 is formed using the photosensitive film, the resist component is not leaked through the opening section even in the substrate (front surface plate) including the opening portion, and the resist component is not extruded from the glass end in the mask layer in which it is necessary to form a light-shielding pattern almost up to the boundary with the front surface plate, and therefore it becomes possible to manufacture a touch panel having merits of the reduction in the layer thickness and weight with simple steps without contaminating the back side of the substrate.

Furthermore, when the photosensitive film having a specific layer constitution in which the thermoplastic resin layer is provided between the photo-curable resin layer and the temporary supporter is used for the formation of the mask layer 2 which is required to shield light, it is possible to prevent the generation of air bubbles during the lamination of the photosensitive film, and to form the high-quality mask layer 2 from which light is not leaked.

In addition, in a case in which the mask layer is formed using the photosensitive film, it is possible to use a coloring agent in the photo-curable resin layer. As the coloring agent, a well-known coloring agent (an organic pigment, an inorganic pigment, a dye, or the like) can be preferably used.

The mask layer is preferably a black mask layer or a white mask layer (in some cases, also referred to as the decoration layer). For example, in a case in which the black mask layer 2 is formed, the black mask layer is preferably formed by transferring the black photo-curable resin layer to the surface of the front surface plate 1 using the photosensitive film including the black photo-curable resin layer as the photo-curable resin layer. Furthermore, it is possible to use a mixture of a red pigment, a blue pigment, a green pigment, and the like instead of the black coloring agent.

In a case in which the photo-curable resin layer is used as the black mask layer, the photo-curable resin layer preferably includes a black coloring agent from the viewpoint of the optical density. Examples of the black coloring agent include carbon black, titanium carbon, iron oxide, titanium oxide, graphite, and the like, and, among them, carbon black is preferred.

In a case in which the photo-curable resin layer is used as the white mask layer, it is possible to use the white pigment described in paragraphs [0015] or [0114] in JP2005-7765A.

To use the photo-curable resin layer as the mask layer having a different color, the pigment or dye described in paragraphs [0183] to [0185] and the like in JP4546276B may be used in a mixture form. Specifically, it is possible to preferably use the pigment and dye described in paragraphs [0038] to [0054] in JP2005-17716A, the pigments described in paragraphs [0068] to [0072] in JP2004-361447A, the coloring agents described in paragraphs [0080] to [0088] in JP2005-17521A, and the like.

The coloring agent (preferably the pigment, and more preferably carbon black) is desirably used as the dispersion fluid. The dispersion fluid can be prepared by adding and dispersing a composition obtained in advance by mixing the coloring agent and a pigment dispersing agent in an organic solvent (or a vehicle) described below. The vehicle refers to a section of a medium in which the pigment is dispersed when paint is in a liquid phase, and includes a component (a binder) which is in a liquid phase, and is bonded to the pigment so as to form a coated film and a component (an organic solvent) which dissolves and dilutes the above-described component.

A disperser used to disperse the pigment is not particularly limited, and examples thereof include well-known dispersers such as a kneader, a roll mill, an attritor, a super mill, a dissolver, a homomixer, and a sand mill described on page 438, in "The Dictionary of Pigments" Vol. 1 (2000), Kunizo Asakura, Asakura Publishing Co., Ltd. Furthermore, the pigment may also be finely crushed through the mechanical attrition described on page 310 using a friction force.

The number-average particle diameter of the coloring agent is preferably in a range of 0.001 µm to 0.1 µm, and more preferably in a range of 0.01 µm to 0.08 µm from the viewpoint of the dispersion stability. The "particle diameter" mentioned herein refers to the diameter of a circle having the same area as a particle in an electron microscope photographic image, and the "number-average particle diameter" refers to the average value of the particle diameters of 100 particles out of a number of particles.

The layer thickness of the photo-curable resin layer including the coloring agent is preferably in a range of 0.5 µm to 10 µm, more preferably in a range of 0.8 µm to 5 µm, and particularly preferably in a range of 1 µm to 3 µm. The content ratio of the coloring agent in the solid content of the photo-curable resin layer including the coloring agent is not particularly limited, but is preferably in a range of 15 mass % to 70 mass %, more preferably in a range of 20 mass % to 60 mass %, and still more preferably in a range of 25 mass % to 50 mass % from the viewpoint of sufficiently shortening the development duration.

The total solid content mentioned in the present specification refers to the total mass of non-volatile components in the photo-curable resin layer including the coloring agent excluding the solvent and the like.

(First and Second Transparent Electrode Patterns, Conductive Element)

On the touch surface of the front surface plate 1, a plurality of first transparent electrode patterns 3 in which a plurality of pad sections are formed to extend in a first direction through connection sections, a plurality of second transparent electrode patterns 4 which are electrically insulated from the first transparent electrode patterns 3, and are constituted of a plurality of pad sections formed so as to extend in a direction intersecting the first direction, and the transparent insulating layer 5 which electrically insulates the first transparent electrode patterns 3 and the second transparent electrode patterns 4 are formed. The first transparent electrode patterns 3, the second transparent electrode patterns 4, and the conductive element 6 described below can be produced using a translucent conductive metal oxide film such as indium tin oxide (ITO), indium zinc oxide (IZO), or the like. Examples of the metal film include ITO films; metal films of Al, Zn, Cu, Fe, Ni, Cr, Mo, and the like; metal oxide films such as $SiO_2$ films; and the like. At this time, it is possible to set the film thicknesses of the respective elements in a range of 10 nm to 200 nm. In addition, since an amorphous ITO film is transformed into a polycrystalline ITO film through firing, it is also possible to reduce the electrical resistance. In addition, the first transparent electrode patterns 3, the second transparent electrode patterns 4, and the conductive element 6 described below can also be manufactured using the photosensitive film including a photo-curable resin layer for which the conductive fiber is used. Additionally, in a case in which the first conductive patterns and the like are formed using ITO and the like, it is possible to refer to paragraphs [0014] to [0016] in JP4506785B.

In addition, at least one of the first transparent electrode patterns 3 and the second transparent electrode patterns 4 can be installed straddling both regions of the non-touch surface of the front surface plate 1 and the surface of the mask layer 2 opposite to the front surface plate 1. FIG. 1 illustrates that the second transparent electrode patterns are installed straddling both regions of the non-touch surface of the front surface plate 1 and the surface of the mask layer 2 opposite to the front surface plate 1. As described above, even in a case in which the photosensitive film is laminated straddling the mask layer which is required to have a certain thickness and the back surface of the front surface plate, when the photosensitive film is used, lamination causing no generation of foam in the boundary of the mask section becomes possible with simple steps without the use of an expensive facility such as a vacuum laminator.

Figure 3:
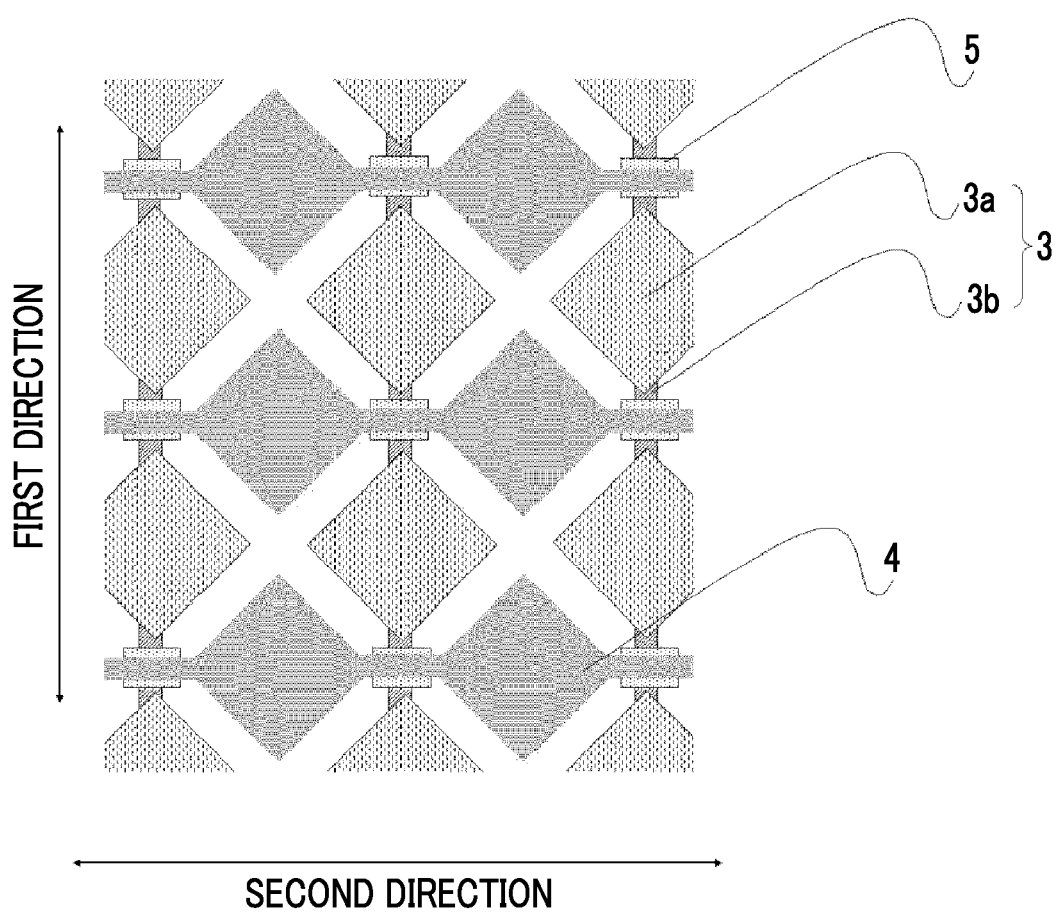
FIG. 3 is an explanatory view illustrating an example of first transparent electrode patterns and second transparent electrode patterns in the present invention.

The first transparent electrode patterns 3 and the second transparent electrode patterns 4 will be described using FIG. 3. FIG. 3 is an explanatory view illustrating an example of the first transparent electrode patterns and the second transparent electrode patterns in the electrostatic capacitance type input device of the present invention. As illustrated in FIG. 3, in the first transparent electrode patterns 3, a plurality of pad sections 3a are formed to extend in the first direction through connection sections 3b. In addition, the second transparent electrode patterns 4 are electrically insulated from the first transparent electrode patterns 3 by the insulating layer 5, and are constituted of a plurality of pad sections formed so as to extend in a direction intersecting the first direction (a second direction in FIG. 3). Here, in a case in which the first transparent electrode patterns 3 are formed, it is possible to integrally produce the pad sections 3a and the connection sections 3b, or to produce only the connection sections 3b so as to integrally produce (pattern) the pad sections 3a and the second transparent electrode patterns 4. In a case in which the pad sections 3a and the second transparent electrode pattern 4 are integrally produced (patterned), as illustrated in FIG. 3, a part of the connection section 3b and a part of the pad section 3a are coupled to each other, and individual layers are formed so that the first transparent electrode patterns 3 and the second transparent electrode patterns 4 are electrically insulated by the insulating layer 5.

In FIG. 1, the conductive element 6 is installed on the surface of the mask layer 2 opposite to the front surface plate 1. The conductive element 6 is electrically connected to at least one of the first transparent electrode patterns 3 and the second transparent electrode patterns 4, and is a separate element from the first transparent electrode patterns 3 and the second transparent electrode patterns 4. FIG. 1 illustrates that the conductive element 6 is connected to the second transparent electrode patterns 4.

The first transparent electrode patterns 3, the second transparent electrode patterns 4, and the conductive element 6 can be formed (1) using the photosensitive film including the conductive photo-curable resin layer or (2) through an etching treatment.

(1) A Method in which the Photosensitive Film Including the Conductive Photo-Curable Resin Layer is Used In a case in which the first transparent electrode patterns 3, the second transparent electrode patterns 4, and the separate conductive element 6 are formed using the photosensitive film including the conductive photo-curable resin layer, the patterns and the element can be formed by transferring the conductive photo-curable resin layer to the surface of the front surface plate 1.

When the first transparent electrode patterns 3 are formed using the photosensitive film including the conductive photo-curable resin layer, it becomes possible to manufacture a touch panel having merits of the reduction in the layer thickness and weight with simple steps with no leakage of the resist component through the opening section even in the substrate (the front surface plate) including the opening portion and no contamination of the back side of the substrate.

A preferable range of the step of forming the first transparent electrode patterns 3, the second transparent electrode patterns 4, and the separate conductive element 6 by transferring a photo-curable resin layer to the front surface plate 1 using the photosensitive film is the same as the preferable ranges of the respective steps of the photolithography method in the method for forming the transparent insulating layer and the transparent protective layer.

Furthermore, when the photosensitive film having a specific layer constitution in which the thermoplastic resin layer is provided between the conductive photo-curable resin layer and the temporary supporter is used for the formation of the first transparent electrode patterns 3, it is possible to prevent the generation of air bubbles during the lamination of the photosensitive film, and to form the first transparent electrode patterns 3, the second transparent electrode patterns 4, and the separate conductive element 6 which have excellent conductivity and a small resistance.

In a case in which the first transparent electrode patterns, the second transparent electrode patterns, and the separate conductive element are formed using the photosensitive film on which the conductive photo-curable resin layer is laminated, it is possible to use the following conductive fiber and the like for the photo-curable resin layer.

The structure of the conductive fiber is not particularly limited, and can be appropriately selected depending on purpose, but is preferably either a solid structure or a hollow structure.

Here, there are cases in which a fiber with a solid structure will be called a "wire", and a fiber with a hollow structure will be called a "tube". In addition, there are cases in which a conductive fiber having an average short axis length in a range of 5 nm to 1,000 nm and an average long axis length in a range of 1 μm to 100 μm will be called a "nanowire".

In addition, there are cases in which a conductive fiber having a hollow structure and having an average short axis length in a range of 1 nm to 1,000 nm and an average long axis length in a range of 0.1 μm to 1,000 μm will be called a "nanotube".

A material for the conductive fiber is not particularly limited as long as the material is electrically conductive, and can be appropriately selected depending on purpose, but is preferably at least one of metal or carbon. Among them, the conductive fiber is particularly preferably at least any one of a metal nanowire, a metal nanotube, and a carbon nanotube.

——Metal Nanowires——
—Metal—

A material for the metal nanowire is not particularly limited, and, for example, is preferably at least one metal selected from a group consisting of metals belonging to Periods IV, V, and VI in the extended periodic table (IUPAC1991), more preferably at least one metal selected from metals belonging to Groups II to XIV, still more preferably at least one metal selected from metals belonging to Groups II, VIII, IX, X, XI, XII, XIII, and XIV, and particularly preferably includes the metal as a main component.

Examples of the metal include copper, silver, gold, platinum, palladium, nickel, tin, cobalt, rhodium, iridium, iron, ruthenium, osmium, manganese, molybdenum, tungsten, niobium, tantalum, titanium, bismuth, antimony, lead, alloys thereof, and the like. Among them, a material mainly containing silver or a material containing an alloy of silver and a metal other than silver is preferred from the viewpoint of the excellent conductivity.

The material mainly containing silver refers to a material containing 50 mass % or more, and preferably 90 mass % or more of silver in the metal nanowire.

Examples of the metal used in the alloy with silver include platinum, osmium, palladium, iridium, and the like. These metals may be singly used, or two or more metals may be jointly used.

—Shape—

The shape of the metal nanowire is not particularly limited, and can be appropriately selected depending on purpose. For example, it is possible to use the metal nanowire having an arbitrary shape such as a cylindrical shape, a regular parallelepiped shape, or a columnar shape having a polygonal cross-sectional shape, and, for use in which high transparency is required, a cylindrical shape or a cross-sectional shape having a polygonal cross-section with round corners is preferred.

The cross-sectional shape of the metal nanowire can be investigated by applying an aqueous dispersion of the metal nanowire onto the base material, and observing the cross-section using a transmission electron microscope (TEM).

Figure 9:
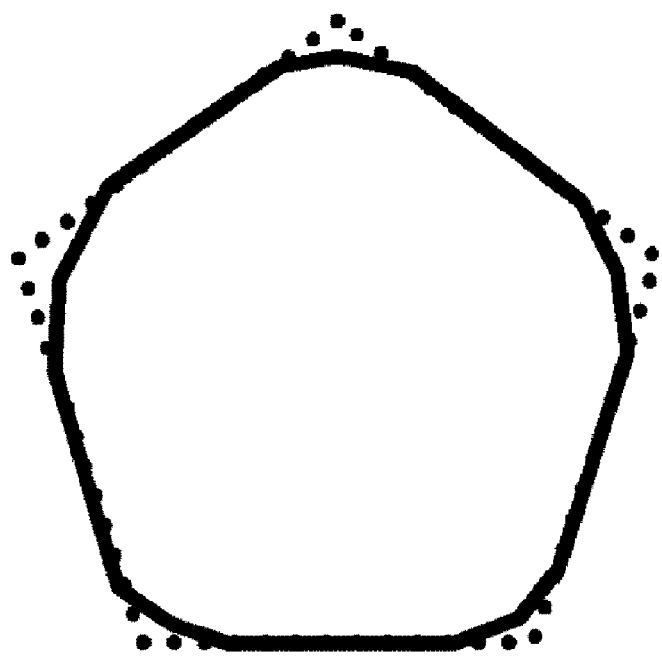
FIG. 9 is an explanatory view illustrating a cross-section of a metal nanowire.

The corner of the cross-section of the metal nanowire refers to a peripheral section of a point at which an extended line from a side of the cross-section intersects a perpendicular line drawn from an adjacent side. In addition, the "side of the cross-section" refers to a straight line connecting adjacent corners. In this case, the proportion of the "outer peripheral length of the cross-section" in the total length of the "sides of the cross-section" has been used as the degree of sharpness. For example, in the cross-section of the metal nanowire as illustrated in FIG. 9, the degree of sharpness can be expressed by the proportion of the outer peripheral length of the cross-section indicated by the solid line in the outer peripheral length of the pentagon indicated by a dotted line.

A cross-sectional shape having a degree of sharpness of 75% or less is defined as a cross-sectional shape with round corners. The degree of sharpness is preferably 60% or less, and more preferably 50% or less. When the degree of sharpness exceeds 75%, there are cases in which the metal nanowire remains yellowish, and thus the transparency deteriorates which may result from the fact that electrons are locally present in the corners, and the plasmon absorption is increased. In addition, there are cases in which the linearity of the edge section of the pattern is decreased, and looseness is caused. The lower limit of the degree of sharpness is preferably 30%, and more preferably 40%.

——Average Short Axis Length and Average Long Axis Length——

The average short axis length (in some cases, referred to as "the average short diameter" or "the average diameter") of the metal nanowire is preferably 150 nm or less, more preferably in a range of 1 nm to 40 nm, still more preferably in a range of 10 nm to 40 nm, and particularly preferably in a range of 15 nm to 35 nm.

When the average short axis length is less than 1 nm, there are cases in which the oxidation resistance deteriorates, and the durability deteriorates, and, when the average short axis length exceeds 150 nm, there are cases in which the metal nanowire causes scattering, and sufficient transparency cannot be obtained.

The average short axis length of the metal nanowire has been obtained by observing 300 metal nanowires using a transmission electron microscope (TEM; manufactured by JEOL Ltd., JEM-2000FX), and computing the average value thereof. Meanwhile, in a case in which the short axis of the metal nanowire is not a round shape, the longest short axis has been used as the short axis length.

The average long axis length (in some cases, referred to as "the average length") of the metal nanowire is preferably in a range of 1 μm to 40 μm, more preferably in a range of 3 μm to 35 μm, and still more preferably in a range of 5 μm to 30 μm.

When the average long axis length is less than 1 μm, there are cases in which it is difficult to form a dense network, and sufficient conductivity cannot be obtained, and, when the average long axis length exceeds 40 μm, there are cases in which the metal nanowires are tangled together during manufacturing due to their excessively long length, and aggregates are generated during the manufacturing process.

The average long axis length of the metal nanowire has been obtained by observing 300 metal nanowires using a transmission electron microscope (TEM; manufactured by JEOL Ltd., JEM-2000FX), and computing the average value thereof. Meanwhile, in a case in which the metal nanowire is bent, a circle having the bending as an arc is imagined, and a value computed from the radius and curvature has been used as the long axis length.

The layer thickness of the conductive photo-curable resin layer is preferably in a range of 0.1 μm to 20 μm, more preferably in a range of 0.5 μm to 18 μm, and particularly preferably in a range of 1 μm to 15 μm from the viewpoint of the stability of the coating fluid or the process aptitude such as drying during coating or the development duration during patterning. The content of the conductive fiber in the total solid content of the conductive photo-curable resin layer is preferably in a range of 0.01 mass % to 50 mass %, more preferably in a range of 0.05 mass % to 30 mass %, and particularly preferably in a range of 0.1 mass % to 20 mass % from the viewpoint of the conductivity and the stability of the coating fluid.

In addition, it is also possible to form a first transparent electrode layer, a second transparent electrode layer, and other conductive members using the photosensitive film as a lift off material. In this case, it is possible to obtain a desired transparent conductive layer pattern by carrying out patterning using the photosensitive film, forming a transparent conductive layer throughout the entire base material surface, then, dissolving and removing the photo-curable resin layer in each accumulated transparent conductive layer (a lift off method).

(2) Method in which an Etching Treatment is Used

In a case in which the first transparent electrode patterns 3, the second transparent electrode patterns 4, and the separate conductive element 6 are formed using an etching treatment, first, a transparent electrode layer of ITO or the like is formed on the non-touch surface of the front surface plate 1 on which the mask layer 2 and the like are formed through sputtering. Next, an etching pattern is formed through exposure and development using the photosensitive film including a photo-curable resin layer for etching as the photo-curable resin layer on the transparent electrode layer. After that, a transparent electrode is patterned by etching the transparent electrode layer, and the etching pattern is removed, whereby the first transparent electrode patterns 3 and the like can be formed.

Even in a case in which the photosensitive film is used as an etching resist (an etching pattern), a resist pattern can be obtained in the same manner as in the method in which the conductive photo-curable resin layer is used. As the etching, it is possible to apply etching and resist peeling using the well-known method described in paragraphs [0048] to [0054] in JP2010-152155A.

Examples of the etching method include an ordinarily-used wet etching method in which the transparent electrode layer is immersed in an etchant. As the etchant used in the wet etching, an acidic etchant or an alkali etchant may be appropriately selected depending on the subject of the etching. Examples of the acidic etchant include aqueous solutions of a sole acidic component such as hydrochloric acid, sulfuric acid, hydrofluoric acid, or phosphoric acid, mixed aqueous solutions of an acidic component and a salt of ferric chloride, ammonium fluoride, or potassium permanganate, and the like. A combination of a plurality of acidic components may be used as the acidic component. In addition, examples of the alkali etchant include aqueous solutions of a sole alkali component such as a salt of an organic amine such as sodium hydroxide, potassium hydroxide, ammonia, organic amine, or tetramethylammonium hydroxide, mixed aqueous solutions of an alkali component and a salt such as potassium permanganate, and the like. A combination of a plurality of alkali components may be used as the alkali component.

The temperature of the etchant is not particularly limited, and is preferably 45° C. or lower. A resin pattern used as an etching mask (etching pattern) in the present invention exhibits superior resistance against the acidic and alkali etchants in the above-described temperature range when being formed using the above-described photo-curable resin layer. Therefore, the peeling of the resin pattern during an etching step is prevented, and sections in which the resin pattern is absent are selectively etched.

After the etching, if necessary, a cleaning step and a drying step may be carried out to prevent line contamination. In the cleaning step, for example, the base material may be cleaned using pure water at room temperature for 10 seconds to 300 seconds, and, in the drying step, the air flow pressure (in a range of approximately 0.1 kg/cm$^2$ to 5 kg/cm$^2$) may be appropriately adjusted using an air flow.

Next, a method for peeling the resin pattern is not particularly limited, and examples thereof include a method in which the base material is immersed in a peeling fluid under stirring at a temperature in a range of 30° C. to 80° C., and preferably in a range of 50° C. to 80° C. for 5 minutes to 30 minutes. The resin pattern used as the etching mask in the present invention exhibits excellent chemical resistance at 45° C. or lower as described above, but has a property of being swollen by an alkaline peeling fluid when the chemical temperature reaches 50° C. or higher. This property brings an advantage that, when a peeling step is carried out using a peeling fluid of 50° C. to 80° C., the step duration is shortened, and the amount of the peeling residue of the resin pattern is decreased. That is, when the etching step and the peeling step are carried out at different chemical temperatures, the resin pattern used as the etching mask in the present invention exhibits favorable chemical resistance in the etching step, and exhibits a favorable peeling property in the peeling step, and thus the resin pattern is capable of satisfying both conflicting characteristics of the chemical resistance and the peeling property.

Examples of the peeling fluid include fluids obtained by dissolving an inorganic alkali component such as sodium hydroxide or potassium hydroxide or an organic alkali component such as tertiary amine or a quaternary ammonium salt in water, dimethyl sulfoxide, N-methylpyrrolidone, or a mixed solution thereof. The resin pattern may be peeled by a spray method, a shower method, a paddle method, or the like using the above-described peeling fluid.

Figure 4:
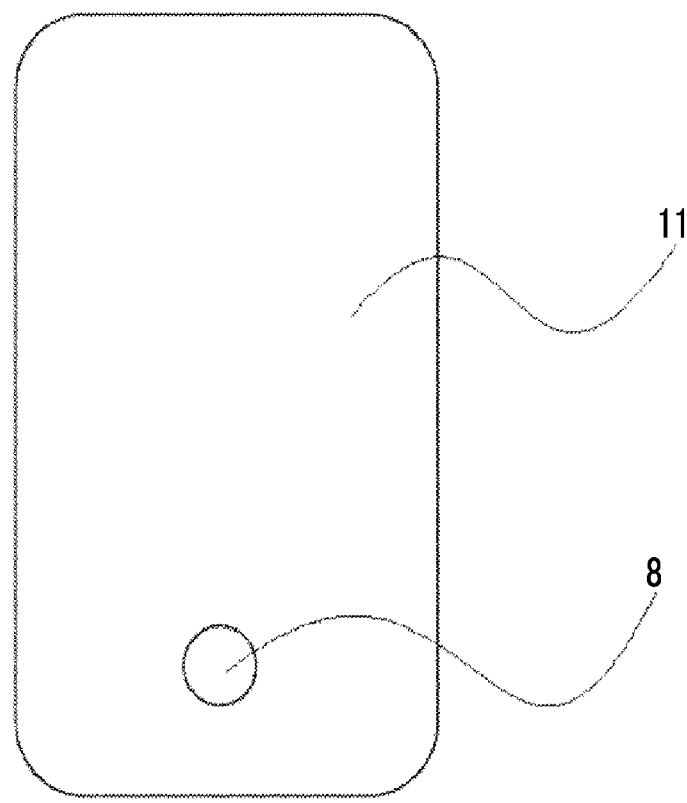
FIG. 4 is a top view illustrating an example of a reinforced glass plate in which an opening portion is formed.
Figure 5:
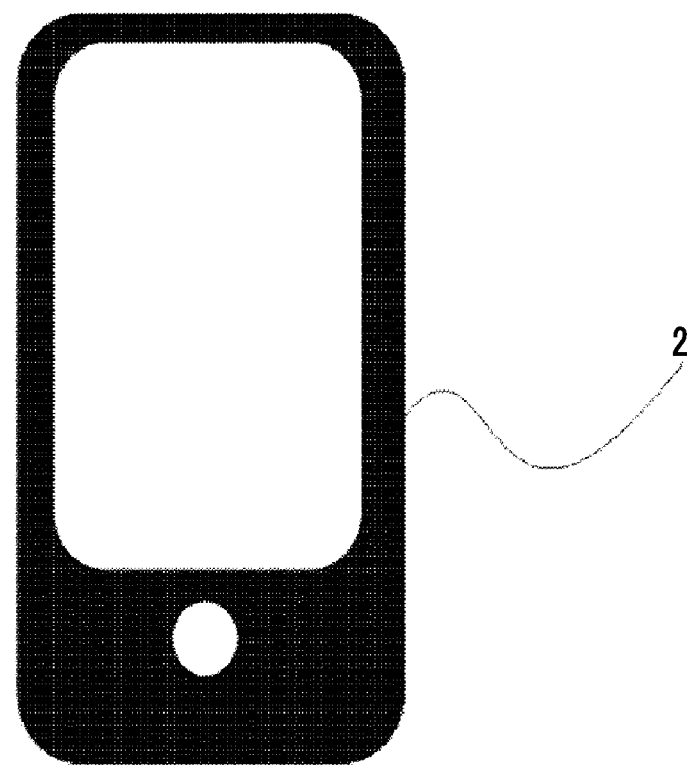
FIG. 5 is a top view illustrating an example of the front surface plate on which a mask layer is formed.
Figure 6:
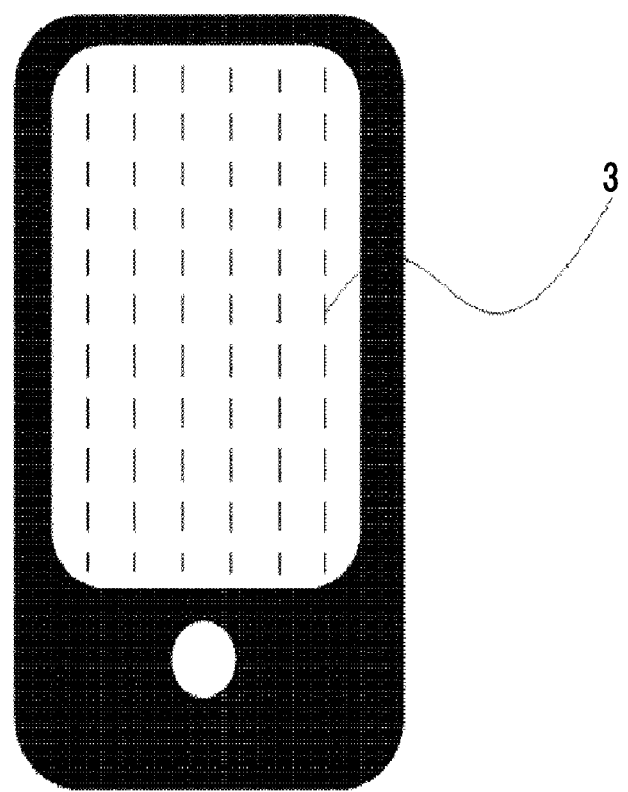
FIG. 6 is a top view illustrating an example of the front surface plate on which first transparent electrode patterns are formed.
Figure 7:
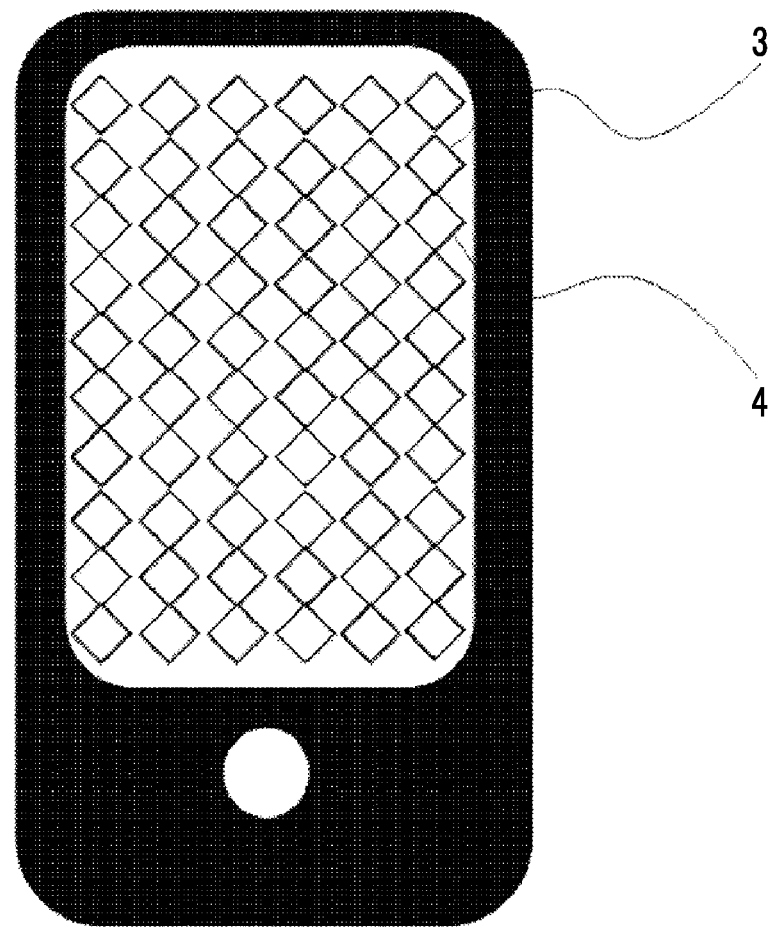
FIG. 7 is a top view illustrating an example of the front surface plate on which first and second transparent electrode patterns are formed.
Figure 8:
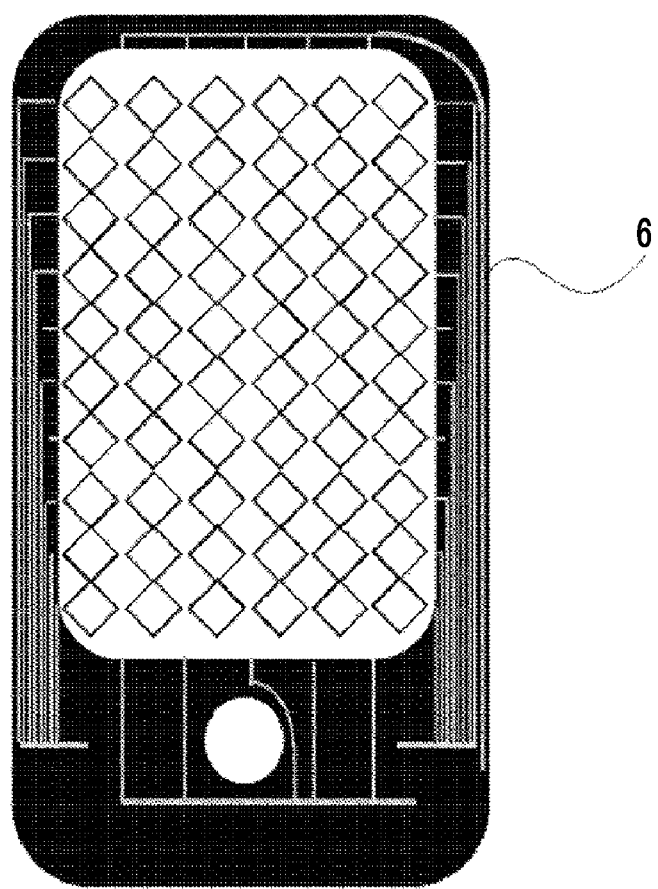
FIG. 8 is a top view illustrating an example of the front surface plate on which a conductive element other than the first and second transparent electrode patterns is formed.

Examples of the aspect of the electrostatic capacitance type input device formed in the process of the manufacturing method of the present invention can include the aspects of FIGS. 4 to 8. FIG. 4 is a top view illustrating an example of a reinforced glass plate 11 in which the opening portion 8 is formed. FIG. 5 is a top view illustrating an example of the front surface plate on which the mask layer 2 is formed. FIG. 6 is a top view illustrating an example of the front surface plate in which the first transparent electrode patterns 3 are formed. FIG. 7 is a top view illustrating an example of the front surface plate in which the first transparent electrode patterns 3 and the second transparent electrode patterns 4 are formed. FIG. 8 is a top view illustrating an example of the front surface plate in which the conductive element 6 other than the first and second transparent electrode patterns is formed. These drawings illustrate specific examples of the above description, and the scope of the present invention is not interpreted to be limited by these drawings.

<<Electrostatic Capacitance Type Input Device and Image Display Device Including the Electrostatic Capacitance Type Input Device as a Constituent>>

An electrostatic capacitance type input device obtained using the manufacturing method of the present invention, and an image display device including the electrostatic capacitance type input device as a constituent may employ the constitutions disclosed by "Advanced Touch Panel Technology" (published on Jul. 6, 2009 by Techno Times Co., Ltd.) edited by Mitani Yuji, "Technologies and Development of Touch Panels", CMC Publishing Co., Ltd. (2004, 12), FPD International 2009 Forum T-11 lecture textbook, Cypress Semiconductor Corporation application note AN2292, and the like.

EXAMPLES

Hereinafter, the characteristics of the present invention will be more specifically described using examples and comparative examples. Materials, usage amounts, proportions, treatment contents, treatment orders, and the like described in the following examples can be appropriately modified within the purpose of the present invention. Therefore, the scope of the present invention should not be interpreted to be limited by specific examples described below. Meanwhile, "%" and "parts" are based on mass unless particularly otherwise described.

Comparative Example 1 and Examples 1 to 10

Preparation of a Transfer Material

A coating fluid for a thermoplastic resin layer having Formulation H1 described below was applied and dried on a 75 μm-thick polyethylene terephthalate film temporary supporter using slit-shaped nozzles. Next, a coating fluid for an intermediate layer having Formulation P1 described below was applied and dried. Furthermore, a coating fluid for a transparent curable resin layer having a formulation described in Table 1 was applied and dried. A thermoplastic resin layer having a dried film thickness of 15.1 μm, an intermediate layer having a dried film thickness of 1.6 μm, and a transparent curable resin layer having a dried film thickness of 2.2 μm so as to obtain an optical density of 4.0 were provided on the temporary supporter in the above-described manner, and finally, a protective film (a 12 μm-thick polypropylene film) was pressure-bonded. A transfer material in which the temporary supporter, the thermoplastic resin layer, the intermediate layer (an oxygen-blocking film), and the transparent curable resin layer were integrally formed was produced, and the transfer material was used as a transfer material (a photosensitive film for the formation of the transparent curable resin layer) in each of the examples and the comparative examples (the film thickness of the transparent curable resin layer was 1.4 μm).

(Coating Fluid for the Thermoplastic Resin Layer: Formulation H1)

Methanol: 11.1 parts by mass

Propylene glycol monomethyl ether acetate: 6.36 parts by mass

Methyl ethyl ketone: 52.4 parts by mass

Methyl methacrylate/2-ethylhexyl acrylate/benzyl methacrylate/methacrylic acid copolymer (copolymer compositional ratio (molar ratio)=55/11.7/4.5/28.8, molecular weight=100,000, Tg≈70° C.): 5.83 parts by mass Styrene/acrylic acid copolymer (copolymer compositional ratio (molar ratio)=63/37, weight-average molecular weight=10,000, Tg≈100° C.): 13.6 parts by mass Monomer 1 (trade name: BPE-500, manufactured by Shin-Nakamura Chemical Co., Ltd.): 9.1 parts by mass Fluorine-based polymer: 0.54 parts by mass The fluorine-based polymer is a copolymer of 40 parts of $C_6F_{13}CH_2CH_2OCOCH=CH_2$, 55 parts of $H(OCH(CH_3)CH_2)_7OCOCH=CH_2$, and 5 parts of $H(OCHCH_2)_7OCOCH=CH_2$, and is a solution of 30 mass % of methyl ethyl ketone having a weight-average molecular weight of 30,000 (trade name: MEGAFAC 780F, manufactured by DIC Corporation).

The viscosity ηc of the coating fluid for the thermoplastic resin layer H1 at 110° C. was measured after the removal of the solvent, and was described in Table 1.

(Coating Fluid for the Intermediate Layer: Formulation P1)

Polyvinyl alcohol: 32.2 parts by mass (trade name: PVA205, manufactured by Kuraray Co., Ltd., degree of saponification=88%, degree of polymerization: 550)

Polyvinyl pyrrolidone: 14.9 parts by mass:

(trade name: K-30, manufactured by ISP Japan Ltd.)

Distilled water: 524 parts by mass

Methanol: 429 parts by mass (Coating Fluid for the Transparent Curable Resin Layer)

Individual components were mixed so as to obtain a composition described in Table 1, thereby obtaining a coating fluid for the transparent curable resin layer. The viscosity ηa of the coating fluid for the transparent curable resin layer at 110° C. was measured after the removal of the solvent, and was described in Table 1. In addition, the value of ηa/ηc was computed, and was described in Table 1.

In Table 1, a $TiO_2$ dispersion fluid-A was prepared using the following method.

(1) Preparation of a Titanium Dioxide Dispersion Fluid (Dispersion Composition)

A dispersion treatment was carried out on a liquid mixture having the following composition using an ULTRA APEX MILL (trade name) manufactured by Kotobuki Industries Co., Ltd. as a circulation-type dispersion apparatus (a beads mill), thereby obtaining a titanium dioxide dispersion fluid as a dispersion composition.

(Composition)

Titanium dioxide (manufactured by Ishihara Sangyo Kaisha Ltd., trade name: TTO-51(C)): 150 parts The following specific resin 1: 40 parts Propylene glycol monomethyl ether acetate: 250 parts

[Chem. 1]

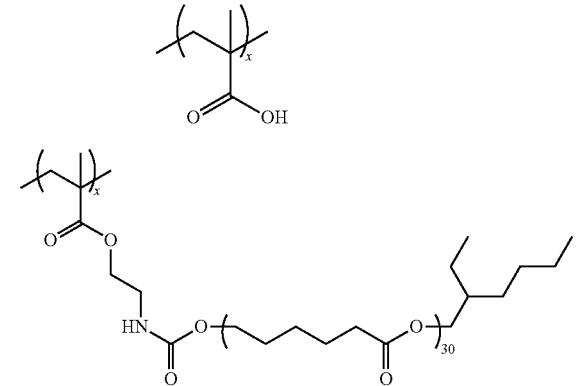

SPECIFIC RESIN 1

In the specific resin 1 expressed by the above-described chemical formula, x:y=20:80, the number of atoms in a graft chain (excluding hydrogen atoms) is 257, and the weight-average molecular weight of the specific resin 1 is 20500.

In addition, the dispersion apparatus was operated under the following conditions.

Bead diameter: ϕ0.05 mm

Bead filling fraction: 75 volume %

Rotation speed: 8 m/sec

Pump supply amount: 10 kg/hour

Cooling water: tap water

Inner volume of a cyclic path in the beads mill: 0.15 L

Amount of a liquid mixture being dispersion-treated: 0.44 kg

After the initiation of dispersion, the average particle diameters were measured at intervals of 30 minutes (the duration of one pass).

The average particle diameter decreased as the dispersion duration (the number of passes) elapsed, but the change amount was gradually decreased. The dispersion was finished at a point in time where the change in the average particle diameter reached 5 nm or less when the dispersion duration was extended as long as 30 minutes. Furthermore, the average particle diameter of titanium dioxide particles in the dispersion fluid was 40 nm.

Furthermore, the average particle diameter of titanium dioxide in each of the examples refers to a value obtained by diluting a liquid mixture or dispersion fluid including titanium dioxide 80 times using propylene glycol monomethyl ether acetate, and measuring the particle diameters for the obtained diluted fluid using a dynamic light scattering method. In this measurement, the number-average particle diameter is obtained using a MICROTRACK UPA-EX150 manufactured by Nikkiso Co., Ltd.

In addition, separately from the above-described measurement, the projected areas of 300 titanium dioxide particles included in the obtained dispersion fluid were respectively obtained using a transmission electron microscope, and the arithmetic average value of the corresponding equivalent circle was obtained, which was 40 nm.

In Table 1, Compound 1 which is a high-refractive index binder having a refractive index of 1.55 or more is CR-1030 (manufactured by Osaka Gas Chemicals Co., Ltd.).

In Table 1, the polarizable compound (b2-1) described in paragraph [0111] in JP2012-78528A, which was used for a monomer mixture, is a mixture which has a structure expressed by the following formula in which all Xs represent acryloyl groups, n=1: the tripentaerythritol octaacrylate content ratio is 85%, and the total of n=2 and n=3 as impurities is 15%.

In Table 1, the compound of the following structural formula P-25 described in paragraph [0058] in JP2008-146018A, which was used for a polymer solution 1, has a weight-average molecular weight of 35,000, and the polymer solution 1 is a solution including 15% of 1-methoxy-2-propyl acetate having a solid content of 45% and 40% of 1-methoxy-2-propanol

[Chem. 3]

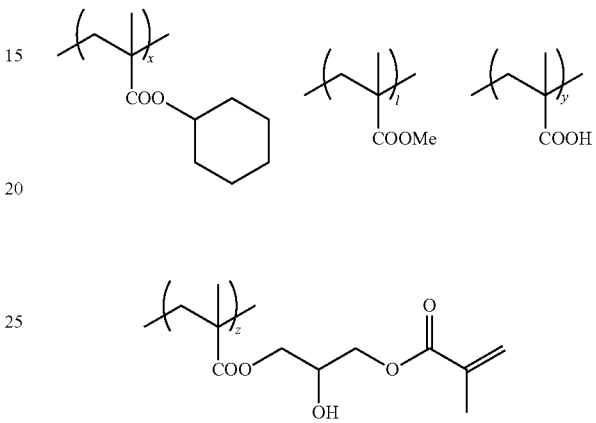

P-25 x:l:y:z = 46:2:20:32

In Table 1, the polymer used for the polymer solution 2 has a structure expressed by Formula (1) described below.

[Chem. 4]

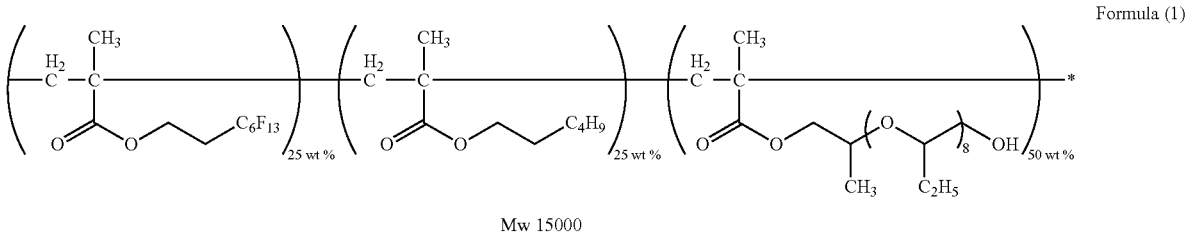

Formula (1)

Mw 15000

[Chem. 2]

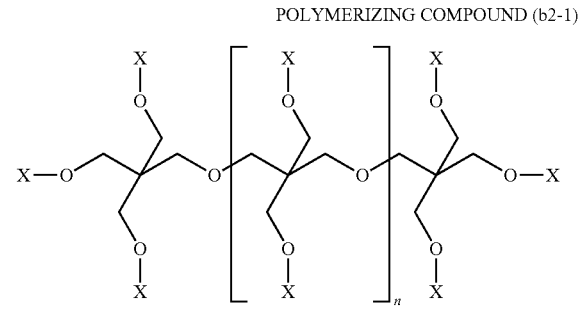

POLYMERIZING COMPOUND (b2-1)

[Measurement of the Refractive Index of the Transparent Curable Resin Layer]

The coating fluid for the transparent curable resin layer obtained above was applied onto a silicon wafer, and then was heated on a hot plate at 100° C. for two minutes, thereby obtaining a transparent pattern. For the substrate on which the transparent pattern had been formed, the optical constant of the transparent pattern was measured using a spectroscopic ellipsometer VUV-VASE (trade name) manufactured by J. A. Woollam Co., Inc. The refractive index of the transparent pattern produced using the coating fluid for the transparent curable resin layer at a wavelength of 550 nm was used as n(550). The obtained results are described in Table 1.

[Measurement of the Reflectivity]

After an ITO film was formed on a transparent glass substrate through sputtering, a black PET material was attached through a transparent adhesive (manufactured by Sumitomo 3M Limited, 8171CL), and the reflectivity was measured using an integrating sphere reflectometer (manufactured by JASCO Corporation, V570) (reflection$_{ITO}$).

Next, similarly, after an ITO film was formed on a transparent glass substrate through sputtering, the photosensitive resin composition was peeled off at the interface with the PET temporary supporter, and then the thermoplastic resin and the intermediate layer were all transferred (a layer-forming step).

Next, the film was exposed from the thermoplastic resin side using a proximity-type stepper including an ultrahigh-pressure mercury lamp (manufactured by Hitachi High-Tech Electronics Engineering Co., Ltd.) at an exposure amount of I ray 40 mJ/cm$^2$. Next, the film was developed by showering a triethanolamine-based developer (containing 30% of triethanolamine, a fluid obtained by diluting T-PD2 (trade name, manufactured by Fujifilm Corporation) 10 times (by mixing T-PD2 and pure water at a ratio of one part to nine parts)) with a flat nozzle pressure of 0.04 MPa at 30° C. for 60 seconds, and the thermoplastic resin and the intermediate layer were removed. Subsequently, the fluid was drained by spraying air to the top surface of the glass substrate, then, the glass substrate was cleaned through pure water showering by blowing pure water through showering for 10 seconds, and the liquid basin on the substrate was decreased by blowing air. Next, after a heating treatment was carried out on the substrate at 230° C. for 60 minutes, the photosensitive resin layer and the black PET material are attached together through a transparent adhesive, the entire substrate was blocked from light, and then the reflectivity was measured using an integrating sphere reflectometer (reflection$_{sample}$).

<Evaluation Criteria>

The reflectivity of the sample was evaluated using the following formula (the value at 550 nm was used as the measured value).

$$(\text{reflection}_{sample})/(\text{reflection}_{ITO}) \times 100\% \qquad \text{Formula:}$$

A: 0% to less than 60%
B: 60% to less than 90%
C: 90% or more

TABLE 1

| | | | Comparative Example 1 | Example 1 | Example 2 | Example 3 | Example 4 | Example 5 | Example 6 | Example 7 | Example 8 | Example 9 | Example 10 |
|---|---|---|---|---|---|---|---|---|---|---|---|---|---|
| Transparent curable resin layer | Composition of coating fluids | Fine particles | TiO$_2$ dispersion fluid-A | 0 | 17.8 | 26.7 | 0 | 0 | 0 | 0 | 0 | 0 | 0 | 0 |
| | | | ZrO$_2$: NANOUSE (manufactured by Nissan Chemical Industries, Ltd.) | 0 | 0 | 0 | 50 | 60 | 70 | 80 | 0 | 0 | 0 | 0 |
| | | | ZrO$_2$: SZR-K (manufactured by Sakai Chemical Industry Co., Ltd.) | 0 | 0 | 0 | 0 | 0 | 0 | 0 | 11.1 | 11.1 | 0 | 0 |
| | | High-refractive index monomer | OGSOL EA-F5510 (manufactured by Osaka Gas Chemicals Co., Ltd.) | 0 | 0 | 0 | 0 | 0 | 0 | 0 | 4.6 | 4.6 | 0 | 0 |
| | | | OGSOL EA-F5503 monomer (manufactured by Osaka Gas Chemicals Co., Ltd.) | 0 | 0 | 0 | 0 | 0 | 0 | 0 | 0 | 0 | 4.6 | 4.7 |
| | | High-refractive index binder | Compound 1 | 0 | 0 | 0 | 0 | 0 | 0 | 0 | 0 | 4 | 14.9 | 0 |
| | | Other | 1-methoxy-2-propylacetate | 46.5 | 42.5 | 40.5 | 23.5 | 18.9 | 14.3 | 9.7 | 49.1 | 47.8 | 42.5 | 47.2 |
| | | | Methyl ethyl ketone | 30.5 | 28.6 | 27.6 | 0 | 0 | 0 | 0 | 30.2 | 32 | 37.3 | 30.3 |
| | | | Dispersing agent, SOSPER 2000 (manufactured by The Lubrizol Corporation) | 0.3 | 0.3 | 0.3 | 0.6 | 0.6 | 0.6 | 0.6 | 0 | 0 | 0.3 | 0 |
| | | | DPHA fluid (dipentaerythritol hexaacrylate: 38%, dipentaerythritol pentaacrylate: 38%, 1-methoxy-2-propylacetate: 24%, manufactured by Shin-Nakamura Chemical Co., Ltd.) | 1.9 | 1.1 | 0.7 | 2.2 | 1.7 | 1.3 | 0.8 | 0 | 0 | 0 | 0 |
| | | | Urethane-based monomer, UK oligo UA-32P, manufactured by Shin-Nakamura Chemical Co., Ltd.: non-volatile component 75 wt %, 1-methoxy-2-propylacetate: 25 wt % | 0.9 | 0.5 | 0.4 | 1 | 0.8 | 0.6 | 0.4 | 0 | 0 | | |
| | | | Monomer mixture (the polymerizing compound (b2-1) described in paragraph [0111] in JP2012-78528A) | 2.4 | 1.4 | 0.9 | 2.8 | 2.2 | 1.6 | 1 | 0 | 0 | 0 | 0 |
| | | | Polymer solution 1 (having the structural formula P-25 described in paragraph [0058] in JP2008-146018A) | 16.9 | 7.5 | 2.8 | 19.2 | 15.2 | 11.2 | 7.2 | 4.5 | 0 | 0 | 17.3 |
| | | | 2-benzyl-2-dimethylamino-1-(4-morpholino phenyl)-butanone-1 (Irgacure379, manufactured by BASF) | 0.2 | 0.1 | 0.1 | 0.3 | 0.2 | 0.1 | 0.1 | 0.2 | 0.2 | 0.2 | 0.2 |
| | | | KYAYCURE DETX-S (alkyl thioxanthone manufactured by Nippon Kayaku Co., Ltd.) | 0.2 | 0.1 | 0.1 | 0.3 | 0.2 | 0.1 | 0.1 | 0.2 | 0.2 | 0.2 | 0.2 |

TABLE 1-continued

| | Comparative Example 1 | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Polymer solution 2 (General Formula (1); weight-average molecular weight 15000, non-volatile component 30 wt %, methyl ethyl ketone 70 wt %) | 0.1 | 0.1 | 0.1 | 0.2 | 0.2 | 0.2 | 0.2 | 0.1 | 0.1 | 0.1 | 0.1 |
| Total | 100 | 100 | 100 | 100 | 100 | 100 | 100 | 100 | 100 | 100 | 100 |
| Refractive index n(550) of transparent curable resin layer | 1.51 | 1.65 | 1.78 | 1.58 | 1.6 | 1.63 | 1.64 | 1.61 | 1.67 | 1.63 | 1.55 |
| Transfer material evaluation — ITO visibility (reflectivity) | C | B | A | B | B | B | B | B | A | B | B |

From Table 1, it was found that, when the transparent protective layer in the electrostatic capacitance type input device is formed using the transfer film of the present invention, it is possible to improve the visibility of the transparent electrode patterns, and improve the productivity when an electrostatic capacitance type input device for which a perforated substrate is used is manufactured. Meanwhile, From Comparative Example 1, it was found that, when the refractive index of the transparent curable resin layer in the transfer film at a wavelength of 550 nm is below the lower limit value regulated by the present invention, the reflectivity of the transparent electrode patterns is deteriorated, and the visibility cannot be improved.

Examples 101 to 110 and Comparative Example 101: Manufacture 1 of an Electrostatic Capacitance-Type Touch Panel <<Formation of a Mask Layer>>

[Preparation of a Photosensitive Film for Forming the Mask Layer K1]

The coating fluid for the thermoplastic resin layer having Formulation H1 which was used to produce the transfer material of Examples 1 to 10 and Comparative Example 1 was applied and dried on a 75 μm-thick polyethylene terephthalate film temporary supporter using slit-shaped nozzles. Next, the coating fluid for the intermediate layer having Formulation P1 was applied and dried. Furthermore, the coating fluid for the black photo-curable resin layer having Formulation K1 described below was applied and dried. A thermoplastic resin layer having a dried film thickness of 15.1 μm, an intermediate layer having a dried film thickness of 1.6 μm, and a black photo-curable resin layer having a dried film thickness of 2.2 μm so as to obtain an optical density of 4.0 were provided on the temporary supporter in the above-described manner, and finally, a protective film (a 12 μm-thick polypropylene film) was pressure-bonded. A transfer material in which the temporary supporter, the thermoplastic resin layer, the intermediate layer (an oxygen-blocking film), and the black photo-curable resin layer were integrally formed was produced, and was named as a photosensitive film for forming the mask layer K1.

(Coating Fluid for the Black Photo-Curable Resin Layer: Formulation K1)

K pigment-dispersed substance 1: 31.2 parts by mass
R pigment-dispersed substance 1 (having the following composition): 3.3 parts by mass
MMPGAc (manufactured by Daicel Corporation): 6.2 parts by mass
Methyl ethyl ketone (manufactured by Tonen Chemical Corporation): 34.0 parts by mass
Cyclohexanone (manufactured by Kanto Denka Kogyo Co., Ltd.): 8.5 parts by mass
Binder 2 (a randomly copolymerized substance of benzyl methacrylate and methacrylic acid at a molar ratio of 78:22, weight-average molecular weight: 38,000): 10.8 parts by mass
Phenothiazine (manufactured by Tokyo Chemical Industry Co., Ltd.): 0.01 parts by mass
Propylene glycol monomethyl ether acetate solution (76 mass %) of DPHA (dipentaerythritol hexaacrylate, manufactured by Nippon Kayaku Co Ltd.): 5.5 parts by mass
2,4-bis(trichloromethyl)-6-[4'-(N,N-bis(ethoxycarbonylmethyl)amino-3'-bromophenyl]-s-triazine: 0.4 parts by mass
Surfactant (trade name: MEGAFAC 780F, manufactured by DIC Corporation): 0.1 parts by mass Meanwhile, the viscosity of the coating fluid for the black photo-curable resin layer having Formulation K1 at 100° C. after the removal of the solvent was 10000 Pa·sec.

(Composition of the K Pigment-Dispersed Substance 1)

Carbon black (trade name: Nipex35, manufactured by Degussa Corporation): 13.1 mass %
The following dispersing agent 1: 0.65 mass %
Binder 1 (a randomly copolymerized substance of benzyl methacrylate and methacrylic acid at a molar ratio of 72:28, weight-average molecular weight: 37,000): 6.72 mass %
Propylene glycol monomethyl ether acetate: 79.53 mass %

[Chem. 5]

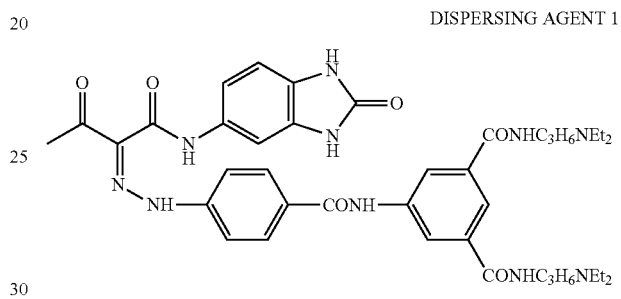

DISPERSING AGENT 1

—Composition of the R Pigment-Dispersed Substance 1—

Pigment (C.I. Pigment 177): 18 mass %
Binder 1 (a randomly copolymerized substance of benzyl methacrylate and methacrylic acid at a molar ratio of 72:28, weight-average molecular weight: 37,000): 12 mass %
Propylene glycol monomethyl ether acetate: 70 mass %

[Formation of a Mask Layer]

Next, a reinforced glass plate (300 mm×400 mm×0.7 mm) in which an opening portion (15 mmφ) was formed was cleaned using a rotating brush including nylon hair under the showering of a glass cleaning agent solution adjusted to 25° C., cleaned for 20 seconds using pure water through showering, then, a silane coupling fluid (an aqueous solution of 0.3 mass % of N-β(aminoethyl)γ-aminopropyltrimethoxysilane, trade name: KBM603, manufactured by Shin-Etsu Chemical Co., Ltd.) was blown through showering for 20 seconds, and cleaned using pure water through showering. The base material was heated at 140° C. for two minutes in a base material preliminary heating apparatus. The protective film was removed from the photosensitive film for forming the mask layer K1 obtained above, the surface of the black photo-curable resin layer, which was exposed after the removal of the protective film, and the surface of the silane coupling-treated glass base material were overlaid with each other so as to come into contact with each other, and the black photo-curable resin layer was laminated on the base material that has been heated at 140° C. using a laminator (manufactured by Hitachi Industries Co., Ltd. (Lamicll-type)) under conditions of a rubber roller temperature of 130° C., a wire pressure of 100 N/cm, and a transportation rate of 2.2 m/minute. Subsequently, the polyethylene terephthalate temporary supporter was peeled off at the interface with the thermoplastic resin layer, and the temporary supporter was removed. After the peeling of the temporary supporter, a pattern was exposed using a proximity-type stepper including an ultrahigh-pressure mercury lamp (manufactured by Hitachi High-Tech Electronics Engineering Co., Ltd.) at an exposure amount of 70 mJ/cm$^2$ (i ray) in a state in which the base material and an exposure mask (a silica exposure mask having a frame pattern) vertically stand, and the distance between the exposure mask surface and the black photo-curable resin layer was set to 200 μm.

Next, the pattern was developed by showering a triethanolamine-based developer (containing 30% of triethanolamine, a fluid obtained by diluting T-PD2 (trade name, manufactured by Fujifilm Corporation) 10 times) with a flat nozzle pressure of 0.1 MPa at 33° C. for 60 seconds, and the thermoplastic resin layer and the intermediate layer were removed. Subsequently, the fluid was drained by spraying air to the top surface of the glass substrate, then, the glass substrate was cleaned through pure water showering by blowing pure water through showering for 10 seconds, and the liquid basin on the substrate was decreased by blowing air.

After that, the pattern was developed at 32° C. with a showering pressure set to 0.1 MPa for 45 seconds using a sodium carbonate/sodium hydrogen carbonate-based developer (a fluid obtained by diluting T-CD1 (trade name, manufactured by Fujifilm Corporation) 5 times using pure water), and was cleaned using pure water.

Subsequently, a surfactant-containing cleaning solution (a solution obtained by diluting T-SD3 (trade name, manufactured by Fujifilm Corporation) 10 times using pure water) was blown through showering with a cone-type nozzle pressure of 0.1 MPa at 33° C. for 20 seconds, and furthermore, the formed pattern image was rubbed with a rotating brush including soft nylon hair, thereby removing the residue. Furthermore, the residue was removed by spraying ultrapure water at a pressure of 9.8 MPa from ultrahigh-pressure cleaning nozzles.

Next, post exposure was carried out in the atmosphere at an exposure amount of 1300 mJ/cm$^2$, and furthermore, a post baking treatment was carried out at 240° C. for 80 minutes, thereby obtaining a front surface plate on which a mask layer having an optical density of 4.0 and a film thickness of 2.0 μm had been formed.

<<Formation of First Transparent Electrode Patterns>>

[Formation of a Transparent Electrode Layer]

The front surface plate on which the mask layer had been formed was introduced into a vacuum chamber, and a 40 nm-thick ITO thin film was formed through DC magnetron sputtering (conditions: a base material temperature of 250° C., an argon pressure of 0.13 Pa, and an oxygen pressure of 0.01 Pa) using an ITO target having a SnO$_2$ content ratio of 10 mass % (indium:tin=95:5 (molar ratio)), thereby obtaining a front surface plate on which a transparent electrode layer was formed. The surface resistance of the ITO thin film was 80 Ω/□.

[Preparation of a Photosensitive Film for Etching E1]

A photosensitive film for etching E1 was obtained in the same manner as in the preparation of the photosensitive film for forming the mask layer K1 except for the fact that the coating fluid for the black photo-curable resin layer was replaced by a coating fluid for the photo-curable resin layer for etching having Formulation E1 described below in the preparation of the photosensitive film for forming the mask layer K1 (the film thickness of the photo-curable resin layer for etching was 2.0 μm).

(Coating Fluid for the Photo-Curable Resin Layer for Etching: Formulation E1)

Methyl methacrylate/styrene/methacrylic acid copolymer (copolymer composition (mass %): 31/40/29, mass-average molecular weight: 60,000, acid value: 163 mgKOH/g): 16 parts by mass Monomer 1 (trade name: BPE-500, manufactured by Shin-Nakamura Chemical Co., Ltd.): 5.6 parts by mass Adduct of 0.5 mole of tetraethylene oxide monomethacrylate of hexamethylene isocyanate: 7 parts by mass Cyclohexane dimethanol monoacrylate as a compound having one polymerizing group in the molecule: 2.8 parts by mass 2-Chloro-N-butylacridone: 0.42 parts by mass 2,2-bis(o-chlorophenyl)-4,4',5,5'-tetraphenyl biimidazole: 2.17 parts by mass Malachite green oxalate: 0.02 parts by mass Leuco Crystal Violet: 0.26 parts by mass Phenothiazine: 0.013 parts by mass Surfactant (trade name: MEGAFAC F-780F, manufactured by DIC Corporation): 0.03 parts by mass Methyl ethyl ketone: 40 parts by mass 1-Methoxy-2-propanol: 20 parts by mass Meanwhile, the viscosity of the coating fluid for the photo-curable resin layer for etching E1 at 100° C. after the removal of the solvent was 2500 Pa·sec.

[Formation of a First Transparent Electrode Pattern]

Similar to the formation of the mask layer, the front surface plate on which the transparent electrode layer had been formed was cleaned, and the photosensitive film for etching E1 from which the protective film had been removed was laminated (under conditions of a base material temperature of 130° C., a rubber roller temperature of 120° C., a wire pressure of 100 N/cm, and a transportation rate of 2.2 m/minute). After the peeling of the temporary supporter, the distance between the exposure mask (a silica exposure mask having a transparent electrode pattern) surface and the photo-curable resin layer for etching was set to 200 and a pattern was exposed at an exposure amount of 50 mJ/cm$^2$ (i ray).

Next, the pattern was treated using a triethanolamine-based developer (containing 30% of triethanolamine, a fluid obtained by diluting T-PD2 (trade name, manufactured by Fujifilm Corporation) 10 times using pure water) at 25° C. for 100 seconds, and was treated using the surfactant-containing cleaning solution (a solution obtained by diluting T-SD3 (trade name, manufactured by Fujifilm Corporation) 10 times using pure water) at 33° C. for 20 seconds, the residue was removed using a rotating brush and ultrahigh-pressure cleaning nozzles, and furthermore, a post baking treatment was carried out at 130° C. for 30 minutes, thereby obtaining a front surface plate on which the transparent electrode layer and the photo-curable resin layer pattern for etching were formed.

The front surface plate on which the transparent electrode layer and the photo-curable resin layer pattern for etching were formed was immersed in an etching tank filled with an ITO etchant (hydrochloric acid, potassium chloride aqueous solution, liquid temperature 30° C.), was treated for 100 seconds, and the transparent electrode layer in exposed regions not covered with the photo-curable resin layer for etching was dissolved and removed, thereby obtaining a front surface plate to which the transparent electrode layer pattern to which the photo-curable resin layer pattern for etching was attached was attached.

Next, the front surface plate to which the transparent electrode layer pattern to which the photo-curable resin layer pattern for etching was attached was attached was immersed in a resist peeling tank filled with a resist peeling fluid (N-methyl-2-pyroolidone, monoethanolamine, a surfactant (trade name: SURFYNOL 465 manufactured by Air Products and Chemicals, Inc.), liquid temperature 45° C.) was treated for 200 seconds, and the photo-curable resin layer for etching was removed, thereby obtaining a front surface plate on which the mask layer and the first transparent electrode patterns were formed.

<<Formation of an Insulating Layer>>

Similar to the formation of the mask layer, the front surface plate to which the first transparent electrode patterns had been attached was cleaned, was subjected to a silane coupling treatment, and the transfer material of Examples 1 to 10 and Comparative Example 1 from which the protective film had been removed was laminated (under conditions of a base material temperature of 100° C., a rubber roller temperature of 120° C., a wire pressure of 100 N/cm, and a transportation rate of 2.3 m/minute). After the peeling of the temporary supporter, the distance between the exposure mask (a silica exposure mask having a pattern for the insulating layer) surface and the photo-curable resin layer for etching was set to 100 and the pattern was exposed at an exposure amount of 30 mJ/cm$^2$ (i ray).

Next, the pattern was treated using a triethanolamine-based developer (containing 30% of triethanolamine, a fluid obtained by diluting T-PD2 (trade name, manufactured by Fujifilm Corporation) 10 times using pure water) at 33° C. for 60 seconds, and was treated using the sodium carbonate/sodium hydrogen carbonate-based developer (a solution obtained by diluting T-CD1 (trade name, manufactured by Fujifilm Corporation) five times using pure water) at 25° C. for 50 seconds, was treated using a surfactant-containing cleaning solution (a solution obtained by diluting T-SD3 (trade name, manufactured by Fujifilm Corporation) 10 times using pure water) at 33° C. for 20 seconds, the residue was removed using a rotating brush and ultrahigh-pressure cleaning nozzles, and furthermore, a post baking treatment was carried out at 230° C. for 60 minutes, thereby obtaining a front surface plate on which an insulating layer pattern which had been formed using the mask layer, the first transparent electrode patterns, and the transfer material of Examples 1 to 10 and Comparative Example 1 was formed.

<<Formation of Second Transparent Electrode Patterns>>

[Formation of a Transparent Electrode Layer]

The front surface plate on which up to the insulating layer pattern that had been formed using the transfer material of Examples 1 to 10 and Comparative Example 1 was formed was subjected to a DC magnetron sputtering treatment (conditions: a base material temperature of 50° C., an argon pressure of 0.13 Pa, and an oxygen pressure of 0.01 Pa) in the same manner as in the formation of the first transparent electrode patterns, and an 80 nm-thick ITO thin film was formed, thereby obtaining a front surface plate on which a transparent electrode layer was formed. The surface resistance of the ITO thin film was 110 Ω/□.

A front surface plate on which the first transparent electrode patterns, the insulating layer pattern formed using the transfer material of Examples 1 to 10 and Comparative Example 1, the transparent electrode layer, and the photo-curable resin layer pattern for etching had been formed was obtained using the photosensitive film for etching E1 in the same manner as in the formation of the first transparent electrode patterns (a post baking treatment: 130° C. for 30 minutes).

Furthermore, etching (30° C. for 50 seconds) and the removal of the photo-curable resin layer for etching (45° C. for 200 seconds) were carried out in the same manner as in the formation of the first transparent electrode patterns, thereby obtaining a front surface plate on which the mask layer, the first transparent electrode patterns, the insulating layer pattern formed using the transfer material of Examples 1 to 10 and Comparative Example 1, and the second transparent electrode patterns had been formed.

<<Formation of a Conductive Element Other than the First and Second Transparent Electrode Patterns>>

The front surface plate on which the first transparent electrode patterns, the insulating layer pattern that had been formed using the transfer material of Examples 1 to 10 and Comparative Example 1, and the second transparent electrode patterns was formed was subjected to a DC magnetron sputtering treatment in the same manner as in the formation of the first and second transparent electrode patterns, thereby obtaining a front surface plate on which a 200 nm-thick aluminum (Al) thin film was formed.

A front surface plate on which the first transparent electrode patterns, the insulating layer pattern formed using the transfer material of Examples 1 to 10 and Comparative Example 1, the second transparent electrode patterns, and the photo-curable resin layer pattern for etching had been formed was obtained using the photosensitive film for etching E1 in the same manner as in the formation of the first and second transparent electrode patterns (a post baking treatment: 130° C. for 30 minutes).

Furthermore, etching (30° C. for 50 seconds) and the removal of the photo-curable resin layer for etching (45° C. for 200 seconds) were carried out in the same manner as in the formation of the first transparent electrode patterns, thereby obtaining a front surface plate on which the mask layer, the first transparent electrode patterns, the insulating layer pattern formed using the transfer material of Examples 1 to 10 and Comparative Example 1, the second transparent electrode patterns, and a conductive element other than the first and second transparent electrode patterns had been formed.

<<Formation of a Transparent Protective Layer>>

The transfer material of Examples 1 to 10 and Comparative Example 1 from which the protective film had been removed was laminated on the front surface plate on which up to the conductive element other than the first and second transparent electrode patterns had been formed in the same manner as in the formation of the insulating layer, after the peeling of the temporary supporter, the front surface was exposed at an exposure amount of 50 mJ/cm$^2$ (i ray) without an exposure mask, was subjected to development, post exposure (1000 mJ/cm$^2$), and a post baking treatment, thereby obtaining a front surface plate on which the insulating layer (the transparent protective layer) formed using the transfer material of Examples 1 to 10 and Comparative Example 1 had been laminated so as to cover all the mask layer, the first transparent electrode patterns, the insulating layer pattern formed using the transfer material of Examples 1 to 10 and Comparative Example 1, the second transparent electrode patterns, and a conductive element other than the first and second transparent electrode patterns.

<<Production of an Image Display Device (Touch Panel)>>

The previously-manufactured front surface plate was attached to a liquid crystal display element manufactured using the method described in JP2009-47936A, thereby producing an image display device of Examples 101 to 110 and Comparative Example 101 including an electrostatic capacitance type input device as a constituent using a well-known method.

<<Evaluation of the Front Surface Plate and the Image Display Device>>

In each of the above-described steps, the front surface plate on which the mask layer, the first transparent electrode patterns, the insulating layer pattern, the second transparent electrode patterns, and the conductive element other than the first and second transparent electrode patterns had been formed stayed clean (particularly, the opening portion and the back surface), was easily cleaned, and did not cause any problem of the contamination of other members.

In addition, the mask layer did not include any pin holes, and was excellent in terms of a light-shielding property.

In addition, each of the first transparent electrode patterns, the second transparent electrode patterns, and the conductive element other than the transparent electrode patterns did not have any problem with conductivity, and the first transparent electrode patterns and the second transparent electrode patterns were insulated from each other.

Furthermore, when the transparent insulating layer and the transparent protective layer in the electrostatic capacitance type input device were formed using the transfer material of the present invention, any defects such as air bubbles were not generated both in the transparent insulating layer and the transparent protective layer, the visibility of the transparent electrode patterns was improved, and an image display device having excellent display characteristics was obtained.

Examples 201 to 210 and Comparative Example 201: Manufacture 2 of an Electrostatic Capacitance-Type Touch Panel <<Production of a Photosensitive Film C1 on which the Conductive Photo-Curable Resin Layer is Laminated>>

A photosensitive film C1 on which the conductive photo-curable resin layer was laminated was obtained in the same manner as in the preparation of the photosensitive film for forming the mask layer K1 except for the fact that the coating fluid for the black photo-curable resin layer was replaced by a coating fluid for forming a conductive photo-curable resin layer having Formulation C1 described below in the preparation of the photosensitive film for forming the mask layer K1 (the film thickness of the conductive photo-curable resin layer for etching was 2.0 µm).

<Preparation of a Coating Fluid for Forming the Conductive Photo-Curable Resin Layer>

(Preparation of a Silver Nanowire-Dispersed Substance (1))

A silver nitrate solution obtained by dissolving 0.51 g of silver nitrate powder in 50 mL of pure water was prepared. After that, 1N ammonia water was added to the silver nitrate solution until the solution became transparent, and pure water was added so that the full amount reached 100 mL, thereby preparing an addition fluid A.

In addition, 0.5 g of glucose powder was dissolved in 140 mL of pure water, thereby preparing an addition fluid G Furthermore, 0.5 g of hexadecyl-trimethyl ammonium bromide (HTAB) was dissolved in 27.5 mL of pure water, thereby preparing an addition fluid H.

Next, 20.6 mL of the addition fluid A was fed into a three-neck flask, and was stirred at room temperature. 41 mL of pure water, 20.6 mL of the addition fluid H, and 16.5 mL of the addition fluid G was sequentially added to this fluid using a funnel, and the solution was heated under stirring at 200 rpm at 90° C. for five hours, thereby obtaining a silver nanowire and water-dispersed substance (1).

After the obtained silver nanowire and water-dispersed substance (1) was cooled, polyvinyl pyrrolidone (trade name: K-30, manufactured by Wako Pure Chemical Industries, Ltd.) was added under stirring so as to reach 0.05 with respect to the mass 1 of silver, then, the solution was centrifugally separated, was purified until the conductivity reached 50 µS/cm or less, was further centrifugally separated using propylene glycol monomethyl ether, water was removed, and finally, propylene glycol monomethyl ether was added, thereby preparing a silver nanowire and solvent-dispersed substance (1).

(Preparation of a Coating Fluid for Forming a Conductive Photo-Curable Resin Layer C1)

The following composition was stirred, and was mixed with the silver nanowire-dispersed substance (1) so that the final silver concentration reached 1.0 mass %, thereby preparing a coating fluid for forming a conductive photo-curable resin layer.

Meanwhile, the viscosity of the coating fluid for forming a conductive photo-curable resin layer C1 at 100° C. after the removal of the solvent was 4500 Pa·sec.

—Composition of the coating fluid for forming a conductive photo-curable resin layer C1—

Binder 3 (solid content: 45%): 3.80 parts by mass
KAYARAD DPHA (manufactured by Nippon Kayaku Co., Ltd.): 1.59 parts by mass
2-(dimethylamino)-2-[(4-methylphenyl)methyl]-1-[4-(4-morpholinyl)phenyl]-1-butanone (trade name: Irgacure379, manufactured by BASF): 0.159 parts by mass
EHPE-3150 (manufactured by Daicel Corporation): 0.150 parts by mass
Surfactant (trade name: MEGAFAC F-781F, manufactured by DIC Corporation): 0.002 parts by mass
MMPGAc (manufactured by Daicel Corporation): 19.3 parts by mass <<Formation of the Transparent Electrode Patterns, the Insulating Layer, and the Like>>

After a front surface plate on which a mask layer had been formed was obtained in the same manner as in Examples 101 to 110 and Comparative Example 101, first transparent electrode patterns were formed using a photosensitive film C1 on which the conductive photo-curable resin layer had been laminated.

First, the front surface plate on which the mask layer was formed was cleaned, and the photosensitive film C1 from which the protective film had been removed was laminated (a base material temperature of 120° C., a rubber roller temperature of 120° C., a wire pressure of 100 N/cm, and a transportation rate of 1.7 m/minute). After the peeling of the temporary supporter, the distance between the exposure mask (a silica exposure mask having transparent electrode patterns) surface and the conductive photo-curable resin layer was set to 100 µm, and the patterns were exposed at an exposure amount of 100 mJ/cm$^2$ (i ray).

Next, the pattern was treated using a triethanolamine-based developer (containing 30% of triethanolamine, a fluid obtained by diluting T-PD2 (trade name, manufactured by Fujifilm Corporation) 10 times using pure water) at 30° C. for 60 seconds, was treated using the surfactant-containing cleaning solution (a solution obtained by diluting T-SD3 (trade name, manufactured by Fujifilm Corporation) 10 times using pure water) at 25° C. for 60 seconds, and was treated using the sodium carbonate/sodium hydrogen carbonate-based developer (a solution obtained by diluting T-CD1 (trade name, manufactured by Fujifilm Corporation) five times using pure water) at 33° C. for 20 seconds, the residue was removed using a rotating brush and ultrahigh-pressure cleaning nozzles, and furthermore, a post baking treatment was carried out at 230° C. for 60 minutes, thereby obtaining a front surface plate on which the mask layer and the first transparent electrode patterns were formed.

Subsequently, an insulating layer was formed in the same manner as in Examples 101 to 110 and Comparative Example 101. Next, second transparent electrode patterns were formed using the photosensitive film C1 on which the conductive photo-curable resin layer had been laminated. Furthermore, a conductive element other than the first and second transparent electrode patterns, and a transparent protective layer were formed in the same manner as in Examples 101 to 110 and Comparative Example 101, thereby obtaining a front surface plate.

In addition, an image display device of Examples 201 to 210 and Comparative Example 201 was produced in the same manner as in Examples 101 to 110 and Comparative Example 101.

<<Evaluation of the Front Surface Plate and the Image Display Device>>

In each of the above-described steps, the front surface plate 2 on which the mask layer, the first transparent electrode patterns, the insulating layer pattern, the second transparent electrode patterns, and the conductive element other than the first and second transparent electrode patterns had been formed stayed clean (particularly, the opening portion and the back surface), was easily cleaned, and did not cause any problem with the contamination of other members.

In addition, the mask layer did not include any pin holes, and was excellent in terms of a light-shielding property.

In addition, each of the first transparent electrode patterns, the second transparent electrode patterns, and the conductive element other than the transparent electrode patterns did not have any problem with conductivity, and the first transparent electrode patterns and the second transparent electrode patterns were insulated from each other.

Furthermore, when the transparent insulating layer and the transparent protective layer in the electrostatic capacitance type input device were formed using the transfer film of the present invention, any defects such as air bubbles were not generated both in the transparent insulating layer and the transparent protective layer, the visibility of the transparent electrode patterns was improved, and an image display device having excellent display characteristics was obtained.

As described above, according to the manufacturing method of an electrostatic capacitance type input device of the present invention, it becomes possible to manufacture a high-quality electrostatic capacitance type input device in which the visibility of transparent electrode patterns is improved, and which has merits of the reduction in the layer thickness and weight with simple steps. Therefore, it is found that an electrostatic capacitance type input device manufactured using the manufacturing method of the present invention and an image display device in which the electrostatic capacitance type input device is used have high quality.

What is claimed is:

1. A transfer film comprising:
   a removable temporary support; and
   a transparent curable resin layer laminated on the removable temporary support,
   wherein the transparent curable resin layer includes at least one of A) a monomer having a refractive index of 1.6 or more, the monomer alone having a refractive index of 1.6 or more, and B) a binder having a refractive index of 1.66 or more, the binder alone having a refractive index of 1.66 or more,
   wherein a refractive index of the transparent curable resin layer at a wavelength of 550 nm is 1.55 or more, and
   wherein the transparent curable resin layer is used for a transparent insulating layer or a transparent protective layer in an electrostatic capacitance type input device.

2. The transfer film according to claim 1, wherein the transparent curable resin layer includes 1 mass % to 60 mass % of the monomer having a refractive index of 1.6 or more.

3. The transfer film according to claim 2, wherein the transparent curable resin layer further includes an alkali-soluble resin and a polymerization initiator.

4. The transfer film according to claim 1, wherein the transparent curable resin layer includes 1 mass % to 60 mass % of the binder having a refractive index of 1.66 or more.

5. The transfer film according to claim 4, wherein the binder is a polymer including at least one of an aryl group, an aromatic heterocyclic group, a chlorine atom, a bromine atom, an iodine atom, and a sulfur atom.

6. The transfer film according to claim 1, wherein the transparent curable resin layer includes fine particles having a refractive index of 1.55 or more.

7. The transfer film according to claim 1, wherein a refractive index of the transparent curable resin layer at a wavelength of 550 nm is 1.6 or more.

8. The transfer film according to claim 1, wherein the transparent curable resin layer includes both the monomer having a refractive index of 1.6 or more and the binder having a refractive index of 1.66 or more.

9. The transfer film according to claim 2, wherein a refractive index of the monomer is 1.66 or more.

10. The transfer film according to claim 2, wherein the monomer is a bisarylfluorene-based acrylate.

11. The transfer film according to claim 1, wherein a thermoplastic resin layer is laminated between the removable temporary support and the transparent curable resin layer.

12. The transfer film according to claim 11, wherein a melt viscosity ηc of the thermoplastic resin layer measured at 110° C. is in a range of 250 Pa*s to 3000 Pa*s.

13. The transfer film according to claim 11, wherein a layer thickness of the thermoplastic resin layer is 3 um or more.

14. A manufacturing method of an electrostatic capacitance type input device including at least one of a transparent insulating layer and a transparent protective layer, and a transparent electrode pattern,
   wherein at least one of the transparent insulating layer and the transparent protective layer is formed using the transfer film according to claim 1.

15. An electrostatic capacitance type input device which is manufactured using the manufacturing method of an electrostatic capacitance type input device according to claim 14.

16. An image display device comprising:
   the electrostatic capacitance type input device according to claim 15.

17. The transfer film according to claim 1,
wherein the monomer is selected from the group consisting of bis(4-methacryloylthiophenyl)sulfide, bisphenoxyethanol fluorene diacrylate, vinyl naphthalene, vinyl phenyl sulfide, 4-methacryloxyphenyl-4'-methoxyphenylthioether, tetrabromo bisphenol A diepoxy acrylate, bisarylfluorene-based acrylate, and bis(4-methacryloylthiophenyl)sulfide.

18. A manufacturing method of an electrostatic capacitance type input device,
wherein the electrostatic capacitance type input device includes a front surface plate and at least the following (1) to (5) elements on a non-touch side of the front surface plate, wherein at least one of the (3) and (5) elements is formed using a transfer film,
wherein the transfer film comprises a removable temporary support and a transparent curable resin layer laminated on the removable temporary support, and
wherein a refractive index of the transparent curable resin layer at a wavelength of 550 nm is 1.55 or more,
(1) A plurality of first transparent electrode patterns in which a plurality of pad sections are formed to extend in a first direction through connection sections
(2) A plurality of second transparent electrode patterns which are electrically insulated from the first transparent electrode patterns, and are constituted of a plurality of pad sections formed so as to extend in a direction intersecting the first direction
(3) A transparent insulating layer which electrically insulates the first transparent electrode patterns and the second transparent electrode patterns
(4) A conductive element other than the first transparent electrode patterns and the second transparent electrode patterns which is electrically connected to at least one of the first transparent electrode patterns and the second transparent electrode patterns
(5) A transparent protective layer installed so as to cover all or some of the (1) to (4) elements.

19. The manufacturing method of an electrostatic capacitance type input device according to claim 18,
wherein the front surface plate includes an opening portion in at least a part of the front surface plate.

20. An electrostatic capacitance type input device comprising:
a transparent protective layer; and
a transparent electrode pattern,
wherein a refractive index of the transparent protective layer at a wavelength of 550 nm is 1.55 or more, and
wherein the transparent protective layer includes at least one of A) a cured monomer having a refractive index of 1.6 or more, the cured monomer alone having a refractive index of 1.6 or more, and B) a binder having a refractive index of 1.66 or more, the binder alone having a refractive index of 1.66 or more.

21. An image display device comprising the electrostatic capacitance type input device according to claim 20.

22. The electrostatic capacitance type input device according to claim 20,
wherein the transparent protective layer includes 1 mass % to 60 mass % of the cured monomer having a refractive index of 1.6 or more.

23. The electrostatic capacitance type input device according to claim 22,
wherein the cured monomer is a cured bisarylfluorene-based acrylate.

24. The electrostatic capacitance type input device according to claim 20,
wherein the transparent protective layer includes 1 mass % to 60 mass % of the binder having a refractive index of 1.66 or more.

25. The electrostatic capacitance type input device according to claim 24,
wherein the binder is a polymer including an aryl group, or an aromatic heterocyclic group.

26. The electrostatic capacitance type input device according to claim 20,
wherein the transparent protective layer includes both the cured monomer having a refractive index of 1.6 or more and the binder having a refractive index of 1.66 or more.

27. An electrostatic capacitance type input device comprising:
a transparent insulating layer; and
a transparent electrode pattern,
wherein a refractive index of the transparent insulating layer at a wavelength of 550 nm is 1.55 or more, and
wherein the transparent insulating layer includes at least one of A) a cured monomer having a refractive index of 1.6 or more, the cured monomer alone having a refractive index of 1.6 or more, and B) a binder having a refractive index of 1.66 or more, the binder alone having a refractive index of 1.66 or more.

28. An image display device comprising the electrostatic capacitance type input device according to claim 27.

* * * * *